US011593685B1

(12) United States Patent
Chan et al.

(10) Patent No.: US 11,593,685 B1
(45) Date of Patent: Feb. 28, 2023

(54) OMNICHANNEL INTELLIGENT NEGOTIATION ASSISTANT

(71) Applicants: David Chan, San Francisco, CA (US); Amit Sethi, Fremont, CA (US); Rashi Dhir, New Delhi (IN); Rudolph Darken, Salinas, CA (US)

(72) Inventors: David Chan, San Francisco, CA (US); Amit Sethi, Fremont, CA (US); Rashi Dhir, New Delhi (IN); Rudolph Darken, Salinas, CA (US)

(73) Assignee: INTELLEXT, INC., San Francisco, CA (US)

( * ) Notice: Subject to any disclaimer, the term of this patent is extended or adjusted under 35 U.S.C. 154(b) by 0 days.

(21) Appl. No.: 17/676,685

(22) Filed: Feb. 21, 2022

(51) Int. Cl.
  *G06N 5/04* (2006.01)
  *G06K 9/62* (2022.01)
  *G06N 20/00* (2019.01)
  *G06Q 50/18* (2012.01)

(52) U.S. Cl.
  CPC .......... *G06N 5/042* (2013.01); *G06K 9/6262* (2013.01); *G06N 20/00* (2019.01); *G06Q 50/188* (2013.01)

(58) Field of Classification Search
  None
  See application file for complete search history.

(56) References Cited

U.S. PATENT DOCUMENTS

| | | | |
|---|---|---|---|
| 2019/0019148 A1* | 1/2019 | Kumar | G06Q 10/08345 |
| 2020/0065728 A1* | 2/2020 | Wilson | G06N 5/003 |
| 2020/0394708 A1* | 12/2020 | Celia | G06Q 40/025 |
| 2021/0192651 A1* | 6/2021 | Groth | G06F 21/6263 |

OTHER PUBLICATIONS

Yinping et al., Designing an Intelligent Agent that Negotiates Tactfully with Human Counterparts: A Conceptual Analysis and Modeling Framework, Proceedings of the 42nd Hawaii International Conference on System Sciences, 2009; pp. 1-10 (Year: 2009).*
Patil et al., Intelligent Automated Negotiation System in Business to Consumer E-Commerce, 2021 International Conference on Disruptive Technologies for Multi-Disciplinary Research and Applications (CENTCON-2021); pp. 295-299 (Year: 2021).*

(Continued)

*Primary Examiner* — Alan Chen
(74) *Attorney, Agent, or Firm* — Rudolph P. Darken

(57) ABSTRACT

An omnichannel intelligent negotiation assistant for generating timely, contextual negotiation assistance to a negotiator. The invention includes a semantic term extractor for converting a contract document into a negotiable term sheet. An omnichannel listener captures all negotiation inputs associated with a negotiation event, sequences each negotiation input by time, and analyzes the sentiment of the negotiation inputs in the context of a term sheet. The resulting annotated negotiation input stream is processed by an intervention generator that includes models of the parties and the negotiation itself as well as a referent negotiation model. The intervention generator includes a game theoretic model that, in concert with a trade-off matrix, allows the intervention generator to produce timely contextual interventions to the negotiator that assist in achieving a superior resulting negotiated agreement.

20 Claims, 23 Drawing Sheets

(56) References Cited

OTHER PUBLICATIONS

Malhotra et al., Negotiation Closer Bot: Negotiation Outcome Predictor based on Sentiment Analysis, 2021 5th International Conference on Information Systems and Computer Networks (ISCON) GLA University, Mathura, India. Oct. 22-23, 2021; pp. 1-5 (Year: 2021).*

Chawla et al., Towards Emotion-Aware Agents for Negotiation Dialogues, 2021 9th International Conference on Affective Computing and Intelligent Interaction (ACII); Total Pages: 8 (Year: 2021).*

Analyzing Sentiment https://cloud.google.com/natural-language/docs/analyzing-sentiment.

Economic Value Added https://www.investopedia.com/terms/e/eva.asp.

Intelligent Tutoring Systems https://en.wikipedia.org/wiki/Intelligent_tutoring_system.

Minimax https://en.wikipedia.org/wiki/Minimax.

* cited by examiner

Generic ML Flowchart

CONTRACT ONTOLOGY (structure)

```
Contract
    has_attribute Contract Type (=1)
    contains Expected Clauses (>=1)
        has_attribute Bounds (=1)
        has_attribute Clause Type (=1)
        has_attribute Value (>=1)
        has_attribute Negotiability (t/f)
        contains Expected Parameters (>=0)
            has_attribute Bounds (=1)
            has_attribute Parameter Type (=1)
            has_attribute Value (>=1)
            has_attribute Negotiability (t/f)
        contains Optional Parameters (>=0)
            has_attribute Bounds (=1)
            has_attribute Parameter Type (=1)
            has_attribute Value (>=1)
            has_attribute Negotiability (t/f)
    contains Optional Clauses (>=1)
        has_attribute Bounds (=1)
        has_attribute Clause Type (=1)
        has_attribute Value (>=1)
        has_attribute Negotiability (t/f)
        contains Expected Parameters (>=0)
            has_attribute Bounds (=1)
            has_attribute Parameter Type (=1)
            has_attribute Value (>=1)
            has_attribute Negotiability (t/f)
        contains Optional Parameters (>=0)
            has_attribute Bounds (=1)
            has_attribute Parameter Type (=1)
            has_attribute Value (>=1)
            has_attribute Negotiability (t/f)
    contains Absent Clauses
        has_attribute Bounds (=1)
        has_attribute Clause Type (=1)
        has_attribute Value (>=1)
        has_attribute Negotiability (t/f)
        contains Expected Parameters (>=0)
            has_attribute Bounds (=1)
            has_attribute Parameter Type (=1)
            has_attribute Value (>=1)
            has_attribute Negotiability (t/f)
        contains Optional Parameters (>=0)
            has_attribute Bounds (=1)
            has_attribute Parameter Type (=1)
            has_attribute Value (>=1)
            has_attribute Negotiability (t/f)
```

FIG 10

GOAL: Timely, contextual negotiation assistance (Step 1, Negotiator Type)

OMNICHANNEL INTELLIGENT NEGOTIATION ASSISTANT

COPYRIGHT STATEMENT

All material in this document, including the figures, is subject to copyright protections under the laws of the United States and other countries. The owner has no objection to the reproduction of this document or its disclosure as it appears in official governmental records. All other rights are reserved.

TECHNICAL FIELD

The present invention relates generally to negotiation, machine learning, and game theory.

BACKGROUND OF THE INVENTION

Negotiation is a critical skill in business and in daily life. In business, it is during negotiation where most value is captured or lost. Therefore, it is desirable to be an effective negotiator. But evidence suggests that the disparity between negotiators in their respective negotiation skills is large. Some negotiators are highly skilled, and others are not. While there exists a multitude of courses, books, and other materials to help negotiators to improve and achieve better results from their negotiations, there are no automated or semi-automated tools to help them before, during, and after a negotiation.

The present invention is shown in a schematic view in FIGS. 1 and 2. FIG. 1 is the preferred embodiment and FIG. 2 includes additional features and functions. FIG. 3 shows a simplified view of the primary modules without detail. The invention seeks to address the identified shortcomings by (1) creating a "negotiation platform" that comprises an omnichannel listener (301) for capturing negotiation data and communications that enables the application of AI and machine learning (ML) techniques. These include but are not limited to real-time and time-dependent sentiment analysis during the negotiation as well as the application of game theory to provide the negotiator with timely, context sensitive feedback and assistance that improves the outcome of the negotiation. (2) a semantic term extractor (302) that produces a negotiable term sheet or set of negotiable terms from a document or directly from negotiator communication data, and (3) an intervention generator (303) that produces time and context sensitive assistance to the negotiator during the negotiation to produce an improved outcome. The intervention generator has access to a number of external data sources (304) as well as all the outputs from the omnichannel listener.

The invention disclosed herein is a machine that receives (a) a plurality of communication threads from negotiators, and (optionally) (b) documents pertaining to the negotiation, and (optionally) (c) external information relevant to the negotiation, and produces automated, timely, context sensitive feedback and assistance that improves the outcome of the negotiation.

Definitions

A negotiation is a bidirectional communication involving at least two negotiators, collectively referred to as the parties. A basic negotiation comprises two counterparties with a negotiator on each side. Because, in the context of this invention, the parties are both a negotiator and a counterparty (to each other), this document will refer to the parties collectively as negotiators, and individually as Negotiator A and Negotiator B. However, the term "counterparty" will be used when referring to a negotiator to identify that it is the opposing party (rather than a member of the negotiator's team) that is being referred to.

Negotiators may optionally have a negotiation team to assist them. Participants in the negotiation team might include legal, finance, HR, engineering, sales, supply chain, etc., each member providing input or assistance to the negotiator and in many cases instructing the negotiator as to what values are acceptable for specific terms in the term sheet. This is referred to in this document as internal deliberations to avoid confusion with the primary negotiation with the counterparty, however, in many respects, it is a negotiation among internal stakeholders to establish and maintain internal stakeholder alignment. For example, the sales representative negotiates with finance on price and financial terms. She also negotiates with legal on the legal terms, and with supply chain and production on delivery dates, etc. Stakeholder alignment is a critical element of a successful negotiation. It is a dynamic and iterative process. Internal positions change as negotiations with the external counterparty progress as part of the expected give and take. For this reason, internal deliberations and the external negotiation are both handled similarly as far as creating a time sequence of participant communications and processing the time sequence to produce timely interventions. However, internal deliberations can receive the benefit of visibility into the external negotiation with the counterparty, but the reverse is not true because internal deliberations can never be leaked to a counterparty.

While many negotiations have a lead negotiator who is responsible for managing communication with the counterparty, there is no inherent limitation as to which members of the negotiation team can communicate with the counterparty. Internal communications and deliberations also serve the function of stakeholder alignment, to ensure that all members of the negotiation team are aligned with the objectives for this negotiation. Because internal communications and deliberations between members of the negotiation team are intended to be private to the negotiation team and are not to be disclosed to the counterparty, privacy and security of negotiation communications is an important aspect of the invention. The counterparty negotiator may also have a negotiation team, and their communications and deliberations must also remain private to them.

A contract is a document intended to represent a negotiated agreement. In this specification, we refer to a long-form contract as the full document, including all text, clauses, dates, values, etc. One of the tenets of this invention is that long-form contracts are counterproductive to effective negotiation because they limit the ability of negotiators to focus on key business terms critical to a successful negotiation. Therefore, in cases where a long-form contract is presented as the basis for a negotiation, the invention will convert it into a term sheet. A term sheet is a simplified version of a long-form contract that includes in its simplest form, a list of terms and their associated values. Furthermore, because a term sheet is a collection of terms, it can be extracted from negotiator communications as well as from a long-form contract. Therefore, FIG. 3 shows a communications link from the omnichannel listener (301) to the semantic term extractor (302).

Negotiation Best Practices

This invention provides the negotiator with timely, context sensitive feedback and assistance that improves the outcome of the negotiation. To accomplish this, it is necessary to define what is "improvement". There are many experts and entire books written on the subject of "negotiation best practices" intended to improve negotiation outcomes. Furthermore, there is no agreed upon set of "rules" or "guidelines" that lead to this result. Therefore, the present invention does not assume any best practices, and allows for the dynamic definition and configuration of negotiation best practice rules that inform and guide the intervention generator.

However, throughout this document, for the purpose of illustration and not limitation, a simple set of negotiation principles are presented here.

1. Build trust between yourself and your counterparty.
2. Know yourself. Know what you are trying to accomplish.
3. Study and understand your counterparty.
4. Leverage the differences between you and your counterparty.

The intervention generator uses negotiation best practices as a guide for producing real-time interventions to the negotiator intended to improve the quality and outcome of the resulting negotiated agreement. It uses inputs from the omnichannel listener to provide context for assistance interventions. The set of negotiation principles is intended to be dynamic and can include local policy, rules-of-thumb, or whatever guidance is desirable.

A Negotiation Framework

Presented here is a general framework for negotiation that is used as a reference for the novel features of the present invention. The framework is provided as context for the invention because it shows how the invention assists the negotiator at different phases of a negotiation. Negotiations contain four phases:

Phase 1: Pre-negotiation: In this phase, the negotiator must identify her objectives for the impending negotiation. The negotiator (to the greatest extent possible) studies their counterpart on the opposite side of the negotiation. Before the negotiation begins, the negotiator might determine which terms they want to open the negotiation with and what their initial offer might be.

Phase 2: During negotiation: Here, for example, the negotiator might "break the ice" with a counterparty with which she has never negotiated before to build trust. The parties collectively might explore common objectives. One party (that may be either party), makes an initial offer that may or may not be complete. It may cover only a subset of key terms or it may be a complete offer that can be accepted. The receiving party then responds similarly, with a partial or complete counter offer.

Phase 3: Impasse and Closing: When an impasse occurs, the negotiator evaluates shared value across multiple terms to create options for consideration. This is referred to as a trade-off matrix that allows for one party to give something of value to the other party in return for a concession. This is possible because the parties do not value each term the same. The key here is to identify and assess those differences. Evaluate the options and use them to refine the established bounds for an acceptable agreement. Close terms as they are agreed to but retain a holistic view of the entire negotiation throughout. When all terms are agreed to, review and attain absolute confirmation of closure.

Phase 4: Post-negotiation: Review the negotiation immediately after closing to evaluate performance, expected versus realized value and risk accepted. The closed terms from this agreement can now be inserted into a final contract which, when executed, enters a contract management system (e.g., CLM or similar) to manage execution of the contract.

FIGS. 4-7 show the phases of a negotiation in the context of the present invention, identifying features that support the negotiator in that particular phase of the negotiation.

BRIEF SUMMARY OF THE INVENTION

The technical problem addressed by the present invention is that of automated assistance to human negotiators. While there are many ways human negotiators can improve their negotiating skills, there are no tools to assist them in the context of a negotiation. An important aspect of the present invention is the premise that negotiations are inherently improved when they are based on a term sheet (or collection of terms) rather than the long-form contract because this allows the parties to focus on the business terms and not the legalese typically present in a long form contract. Therefore, the invention includes a semantic term extractor that converts a contract into a negotiable term sheet. However, the term sheet can also either be provided explicitly (as a document), or it can be generated from the communications of the negotiators.

The solution to the problem is to create an omnichannel listener that (1) captures all negotiation inputs associated with a negotiation event, (2) sequences each negotiation input by time, and (3) analyzes the sentiment of the negotiation inputs in the context of the term sheet. The resulting annotated negotiation input stream is processed by the intervention generator that includes models of the parties and the negotiation itself as well as a referent negotiation model. The intervention generator also includes a game theoretic model that, in concert with a trade-off matrix, allows the intervention generator to produce timely contextual interventions to the negotiator that assist in achieving a superior resulting negotiated agreement.

BRIEF DESCRIPTION OF THE DRAWINGS

FIG. 10 is a textual specification of a contract ontology.

DETAILED DESCRIPTION OF THE INVENTION

There are three primary components to the present invention. The semantic term extractor (302, 101) that converts a long-form contract or negotiator communication data into a negotiable term sheet or set of negotiable terms. The omnichannel listener (301, 108) that captures and aggregates all the negotiation input data and sequences them in time. The time-sequenced negotiation data is then analyzed for sentiment in the context of the term sheet to produce a time-synchronized contextual stream of negotiation input data for the intervention generator (303, 119). The time-sequenced negotiation data is also provided to the sentiment analyzer for the purposes of extracting negotiable terms from negotiator communications when a contract or term sheet is not provided. The intervention generator then processes the input negotiation data and produces timely, contextual interventions to the negotiator.

The invention is capable of looking (a) backwards (i.e., analyzing past contracts to mine them for information about obligations and other information concerning closed negotiations—many modern CRM/CLM solutions do this.), (b) to the present (i.e., analyzing the current negotiation and associated historical data and references to assist in the present negotiator), and (c) to the future (i.e., analyzing historical and present negotiation and contract data to make predictions and forecast about the future).

The Semantic Term Extractor

Figure 8:
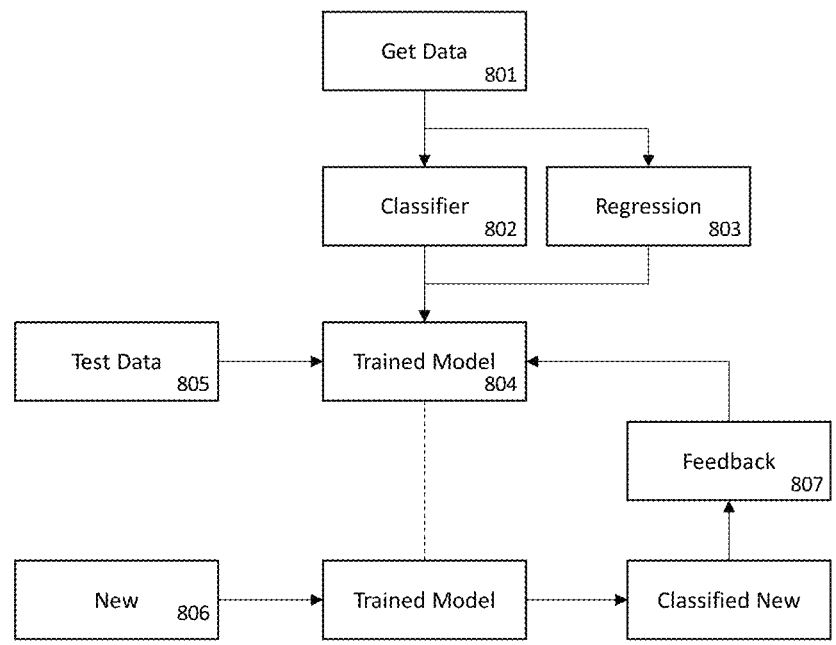
FIG. 8 shows a generic machine learning (ML) process.

The semantic term extractor's primary function is to produce a term sheet or set of negotiable terms on which the negotiation will be based. It accomplishes this by converting a contract document into a negotiable term sheet, or by processing the time-sequenced negotiation data from the omnichannel listener to extract the negotiable terms. The techniques used can be any of the conventional document processing methods including natural language processing, machine learning, rule-based systems, or any combination thereof. FIG. 8 shows a conventional ML approach with input training data (801), a classifier (802) for discrete inputs and a regressor (803) for continuous inputs. The training data for the semantic term extractor is marked-up contracts identifying the terms and term types. The trained model (804) is tested against test data (805) and is then used on operation new data (806) with a feedback loop (807) to the trained model. The conventional ML approach of FIG. 8 is applied as one possible AI technique suitable for several components of the present invention, as described below.

A novel aspect of the present invention is that the semantic term extractor uses a contract ontology to guide the extraction of terms according to a framework of expected clauses and their components. The ontology can be used two ways, forward or backwards. Forward use identifies the type of contract, then the ontology tells the semantic term extractor what terms to look for based on the type of contract. Backward use first identifies a value in the contract itself, and then uses the ontology the identify which term or parameter that value is associated with.

Resolving the conventional ML flowchart of FIG. 8 to the semantic term extractor of the present invention (see FIG. 9), the corpus is marked-up contracts (901) according to the contract ontology (902). The classifier (903) uses the contract ontology to inform the classification, but also, the classifier is itself a feedback loop (903) to the contract ontology, improving it with use. The resulting trained term sheet model (904) can be tested against test data (905) (unmarked contracts). Then in operation, new contracts (906) and the contract ontology (902) are input to the trained term sheet model (904) to produce a negotiable output term sheet (907) with feedback to the trained term sheet model (908).

Figure 1:
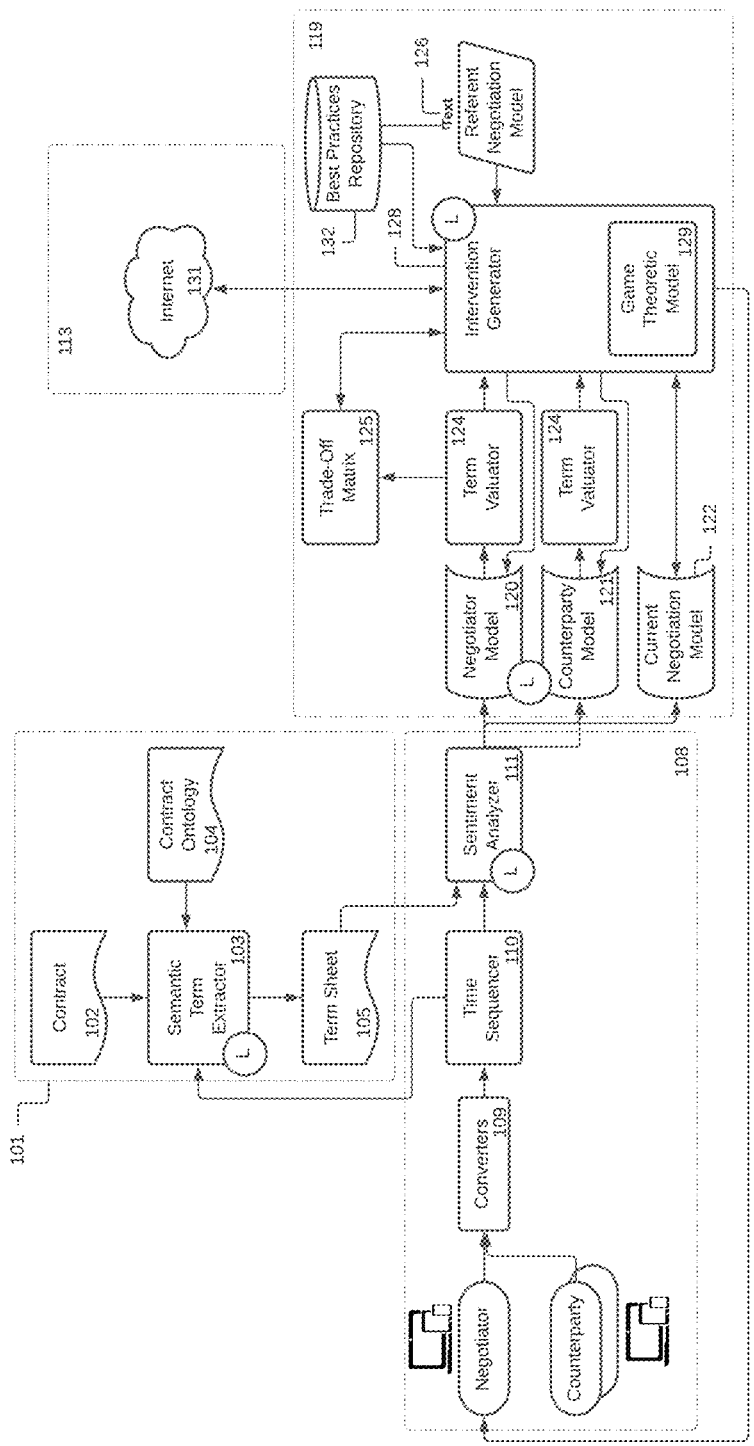
FIG. 1 shows the preferred embodiment which is a subset of the components shown in FIG. 2.
Figure 2:
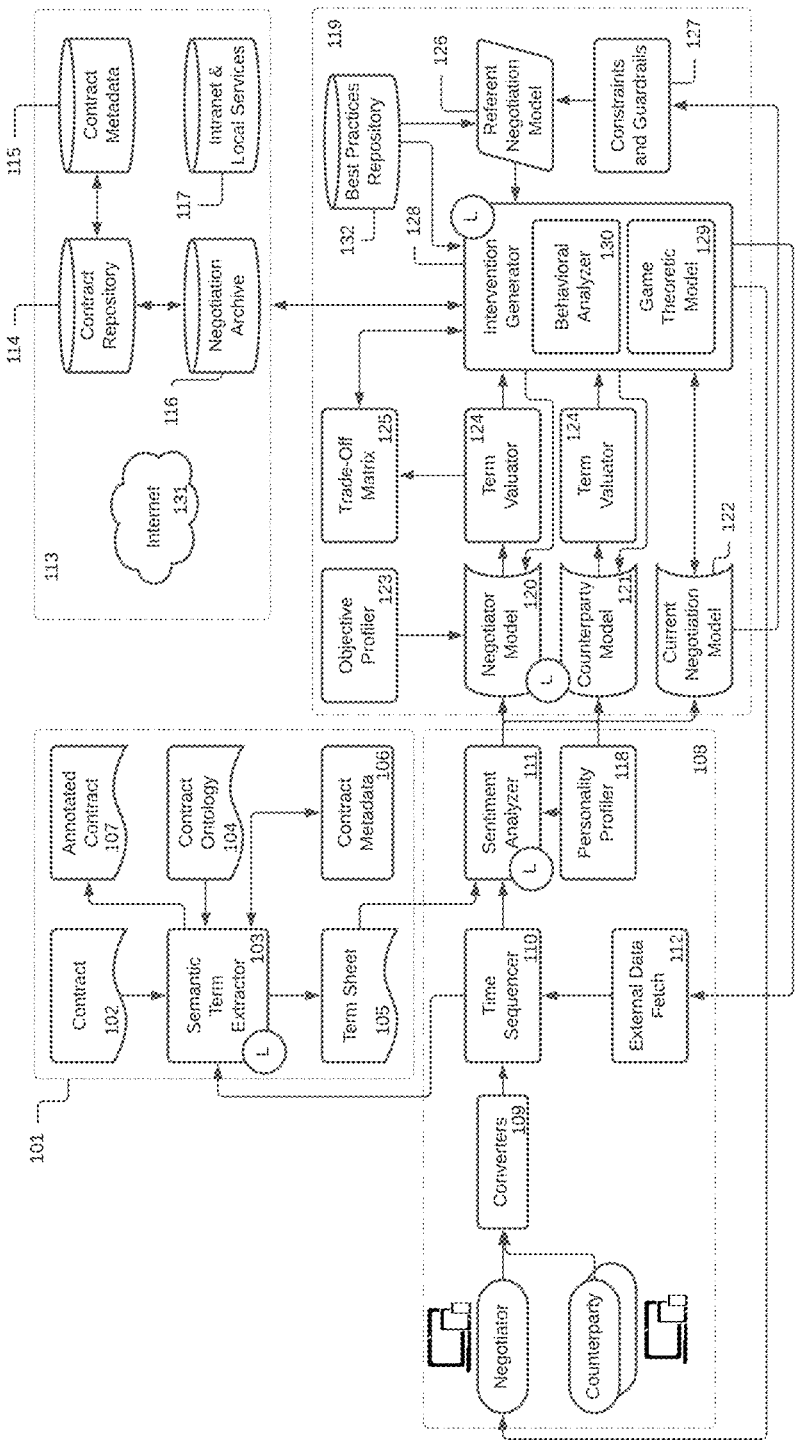
FIG. 2 is a full schematic diagram of the invention, including additional features beyond the preferred embodiment.
Figure 3:
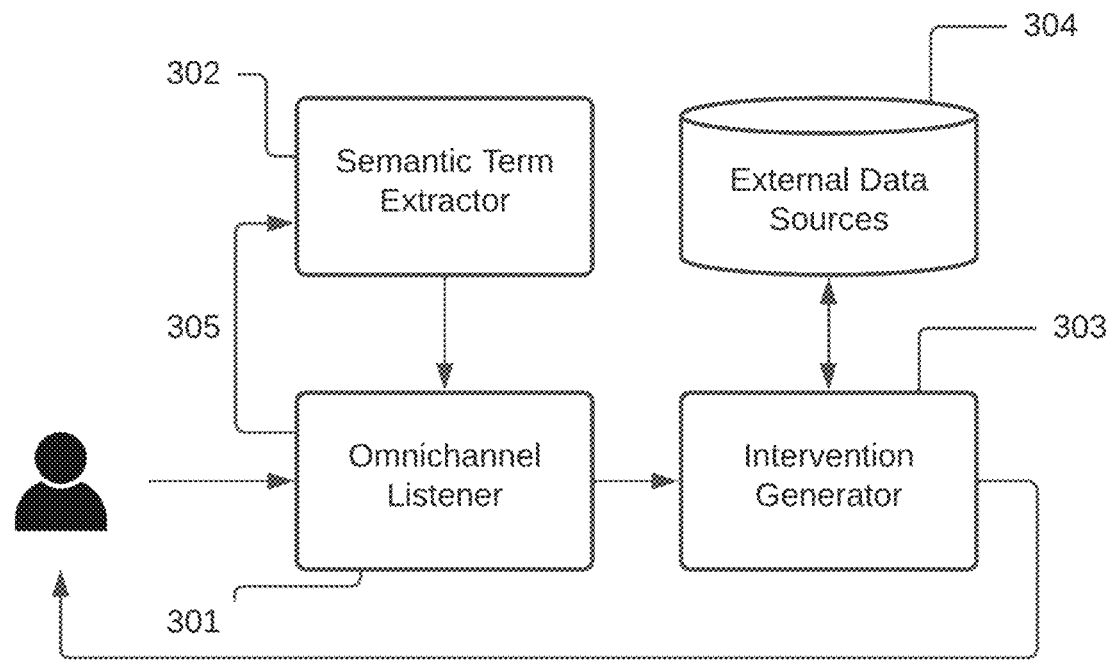
FIG. 3 is a simplified schematic showing the main components and external data sources on which it depends.

The semantic term extractor module (101) is described in the invention schematic (FIGS. 1 and 2). The contract (102) is input in digital form. If it is a scanned PDF, then OCR will be required to convert it to text. Any text format file is acceptable. Using conventional document processing techniques, the semantic term extractor (103) extracts and classifies features of the document. A trained data set is required for this method which is created by manually marking contracts to identify their type, terms, and term parameters. This process is described above. The training dataset produces a reference model. Typically, a clause will reside within a single feature section, but it may span multiple sections. The contract ontology (104) informs the semantic term extractor as described below.

Figure 9:
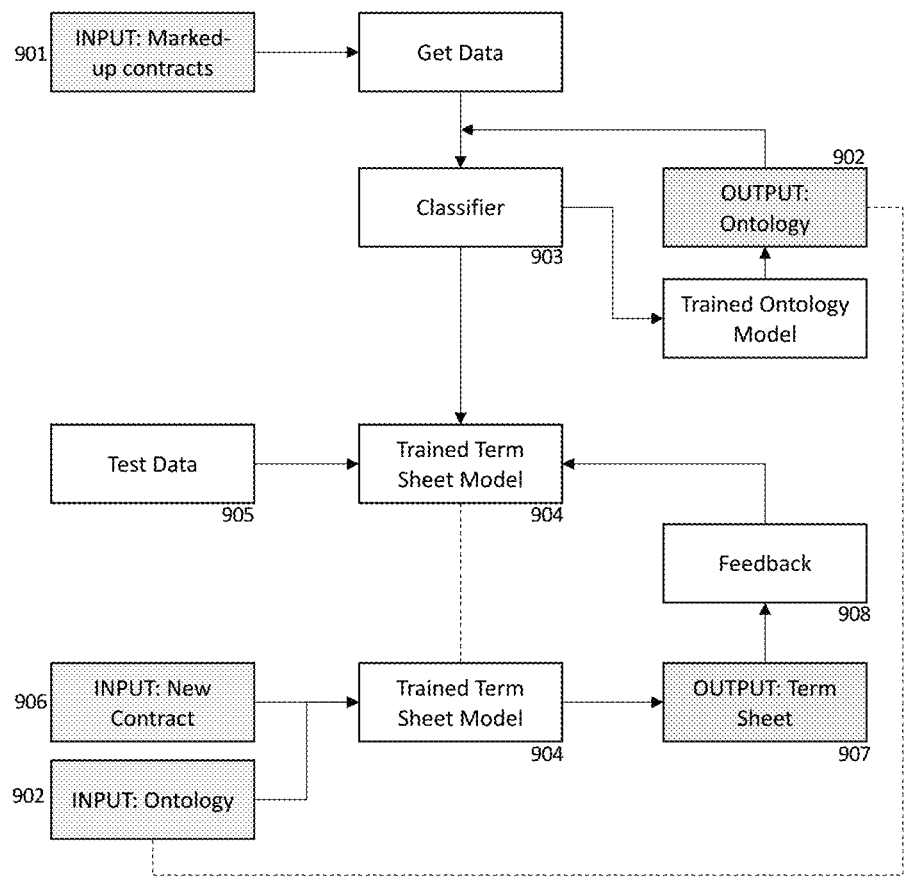
FIG. 9 shows the ML process applied to the semantic term extractor to produce a term sheet.

The semantic term extractor in intended to accept any form of language that constitutes negotiable terms for the impending negotiation. A literal contract is one of several forms contemplated. Another is textual and verbal communications of the negotiators. Any form of language is possible. As discussed in the Omnichannel Listener below, language transmitted in the form of a document, speech, text messages and email, gesture, etc. can all be used to express negotiable terms. Therefore, the semantic term extractor accepts direct time-sequenced negotiation communication input from the omnichannel listener. When no long-form contract or term sheet is made available, the invention extracts negotiable terms from the communications of the negotiators. Because the communication data is converted into textual form, the process to produce the term sheet or set of negotiable terms is unchanged from that described above. Referring to FIG. 9, the input (901) changes to time-sequenced negotiation communication data.

The output of the semantic term extractor is (a) a term sheet (105), (b) contract metadata (106), and (c) an annotated original contract (107) that links each entry in the term sheet and the contract metadata to the original contract. Contract metadata is defined as any critical data in the contract that is not considered a term and therefore should not appear in the term sheet.

Because the contract ontology can take multiple forms, contract ontologies can be stored and serve via private database, cloud services, or similar. Furthermore, the annotated contract (107), the term sheet (105), and the contract metadata (106) can be stored in the contract repository (114). The contract repository itself can be locally or externally served including cloud services.

The Contract Ontology

An ontology is a formal method of specifying the structure of knowledge. It contains the naming and definitions of categories of concepts within a domain, and the properties and relationships among the concepts, data and entities. An ontology of contract content is critical because it provides a roadmap to what should and should not be present in a particular type of contract. There is no "correct" or "universal" contract ontology. The invention contemplates that multiple forms are possible. The contract ontology shown here is for illustrative purposes and is not intended to be limiting.

Figure 11:
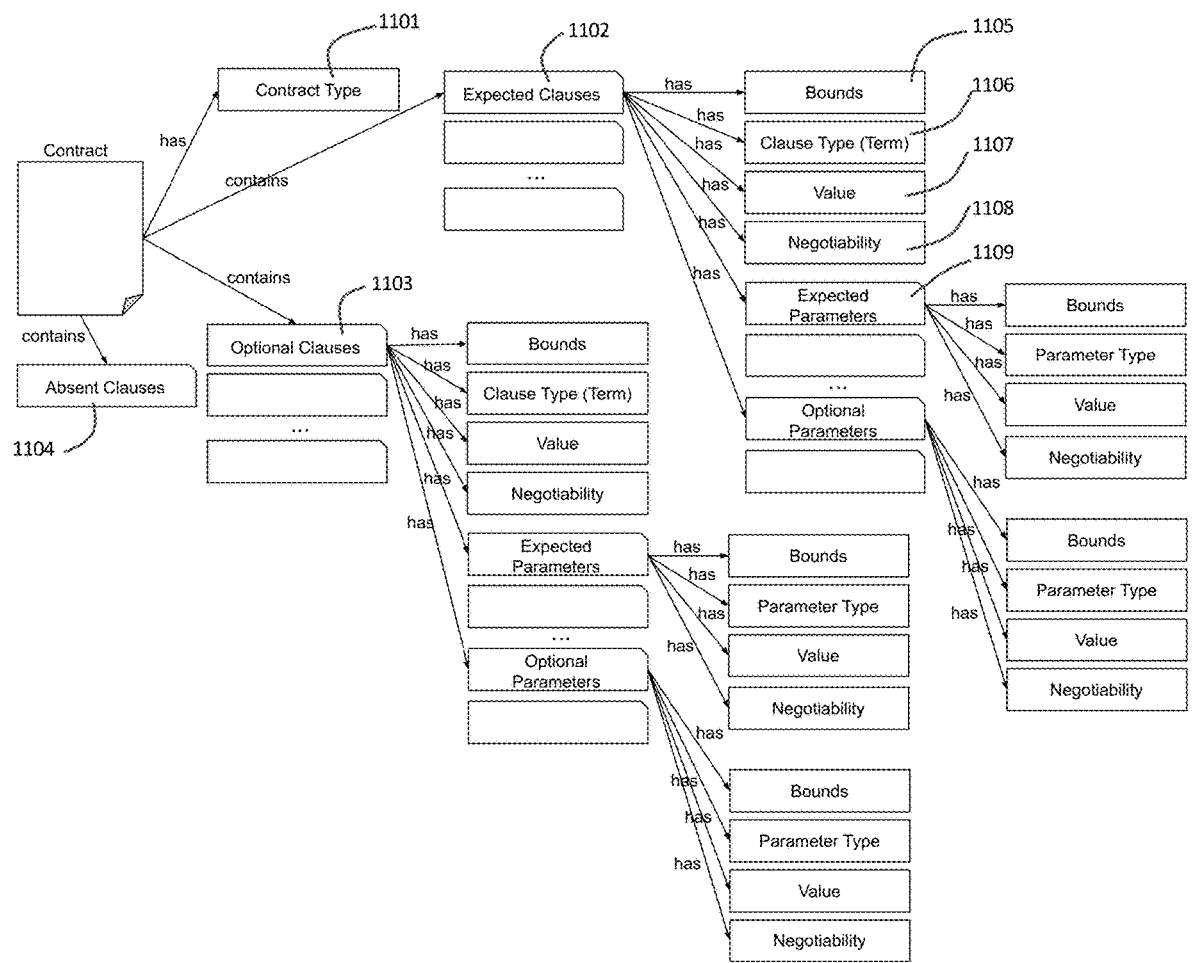
FIG. 11 is a visual depiction of the contract ontology of FIG. 10.

Generally, as shown in FIGS. 10 and 11, a contract has a type (1101) which is enumerated in the ontology, that type then dictates what clauses are expected (1102), which clauses are optional (1103) (i.e., relevant and acceptable, but not mandatory), and because we know what clauses to expect, we can identify which expected clauses are missing (1104).

All clauses have bounds (1105) which are defined as the boundaries within the contract itself that constitute the clause. These may be discontinuous. For example, an indemnity clause may appear in a contract in multiple places, all of which constitute the indemnity clause for that contract. Clauses, like contracts, have a type (1106) which is enumerated in the ontology. We use the word "term" as analogous to "contract type" (e.g. the indemnification clause type is the indemnification term). The value of a clause (1107) is the essence of its legal implications to the contract. A price term, for example, might be a number, whereas a delivery date is a date, and an arbitration clause might be a list of provisions (see below). Not all terms are negotiable, yet they are important and necessary to include in the contract. The ontology indicates if this term is negotiable (1108). Negotiability can be either explicitly stated in the ontology, or it can be learned from past negotiations.

Lastly, clauses often are made up of one or more parameters or provisions (1109). Similar to clauses that constitute a contract, parameters constitute the clause. They also have bounds, types, values, and negotiability.

As a non-limiting example, consider a sales contract.
Contract_type:
　SALES
Expected_clauses:
　SELLER
　　Bounds: [Paragraph 1, lines 2-5]
　　Clause type: SELLER
　　Value: ACME PRODUCTS LTD.
　　Negotiable: FALSE
　BUYER
　　Bounds: [Paragraph 1, lines 5-7]
　　Clause type: BUYER
　　Value: NYX MANUFACTURING
　　Negotiable: FALSE
　ITEM
　　Bounds: [Paragraph 3, lines 2-9]
　　Clause type: ITEM
　　Value: TYPE A WIDGET, SKU 12345
　　Negotiable: TRUE
　COST
　　Bounds: [Paragraph 4, lines 1-2]
　　Clause type: COST
　　Value: $10 PER UNIT
　　Negotiable: TRUE
　QUANTITY
　DELIVERY_DATE
Optional Clauses
　DATE_OF_SALE
　　Bounds: [Paragraph 1, lines 1-2]
　　Clause type: DATE_OF_SALE
　　Value: 12/01/2021
　　Negotiable: FALSE
　WARRANTY
Absent_Clauses
　DELIVERY DATE
　QUANTITY In this example, the semantic term extractor first processes the contract document to determine the contract type. This is accomplished with pattern matching and rules, or similar method. A sales contract would have the words "sales", "procurement", or "purchase" in the introductory paragraphs. With SALES established as the contract type, the ontology now guides the semantic term extractor to look for the terms SELLER, BUYER, ITEM, COST, QUANTITY, and DELIVERY DATE. It finds all of these except QUANTITY and DELIVERY DATE. For each term found, it identifies the bounds in the contract document where that term is to be found (here, listed as paragraph and line numbers, but it could be pixel boundaries, or any other designation that identifies where the term is in the physical document). The contract ontology also informs the semantic term extractor that it may find DATE OF SALE and WARRANTY terms. It does find DATE OF SALE, but not WARRANTY. Lastly, because QUANTITY and DELIVERY DATE are expected but not found, they are listed as absent, whereas WARRANTY is not listed as absent because it is optional.

The Term Sheet

An important premise of the present invention is that negotiating from a term sheet is superior to negotiating from a full contract because it allows the negotiators to focus on the business terms rather than legalese that is often counterproductive to the negotiation process. For the purposes of the present invention, a term sheet could be manually produced as it commonly is in some business domains. However, a term sheet can be automatically produced via semantic term extraction and using the contract ontology and conventional NLP (natural language processing) and ML (machine learning) techniques as described above.

The semantic term extractor uses the contract ontology to guide term extraction regardless of the form of input. From the classified components of the contract document, the system first identifies the contract type using the reference model. The contract ontology identifies from the contract type what clauses are expected. The system processes each classified section to determine which clause type(s) may be present. Once a clause type is recognized, the ontology identifies parameters (provisions) that are expected. Similarly, these are identified within the clause. The bounds within the document for each clause and parameter are identified and recorded as metadata for this contract.

For each clause and parameter, its value is extracted. The value of a term or parameter may be a number, date, or commonly a brief summary of the full text. Again, conventional AI and ML algorithms for text summary can be applied here.

The result from this module is a term sheet (105) that identifies all of the terms and their respective parameters identified in the original contract (by their name as it appears in the ontology) and their associated values. Furthermore, the ontology also allows for the identification of missing terms or parameters that were expected in this type of contract.

As described earlier, the semantic term extractor also has a communications conduit to the omnichannel listener and can therefore create a term sheet or set of negotiable terms from the communications of the negotiators. As an illustrative example, Negotiator A calls Negotiator B and says he wants to discuss a sales agreement for Type A Widgets. Negotiator B replies, asking how many Negotiator A would need because that affects the price he can offer. From this dialogue received by the omnichannel listener and converted to text form, the semantic term extractor identifies that this is a SALES contract with known BUYER, SELLER, and ITEM, but no QUANTITY, PRICE, or DELIVERY DATE. The resulting term sheet becomes the basis for this negotiation.

The Omnichannel Listener

One of the critical problems that the current invention is intended to address is the fact that under current conventional negotiation methods, where negotiators use a plurality of communication modes including but not limited to email, text chat, Slack, Teams, Zoom, and cell phones, disallow the application of AI and ML techniques because there is no "data" or corpus on which to apply the algorithms. By creating a negotiation platform—a place where negotiators come to negotiate—that provides a conduit for all communication modes, the present invention aggregates all the communications related to the present negotiation in a form suitable for the application of AI and ML techniques. This is the role of the omnichannel listener.

The omnichannel listener module (108) is shown in FIG. 1. In order to enable the application of AI and ML techniques to create and deliver time and context sensitive guidance to a negotiator during a negotiation, the system enables the capture and deployment of negotiation data.

Figure 12:
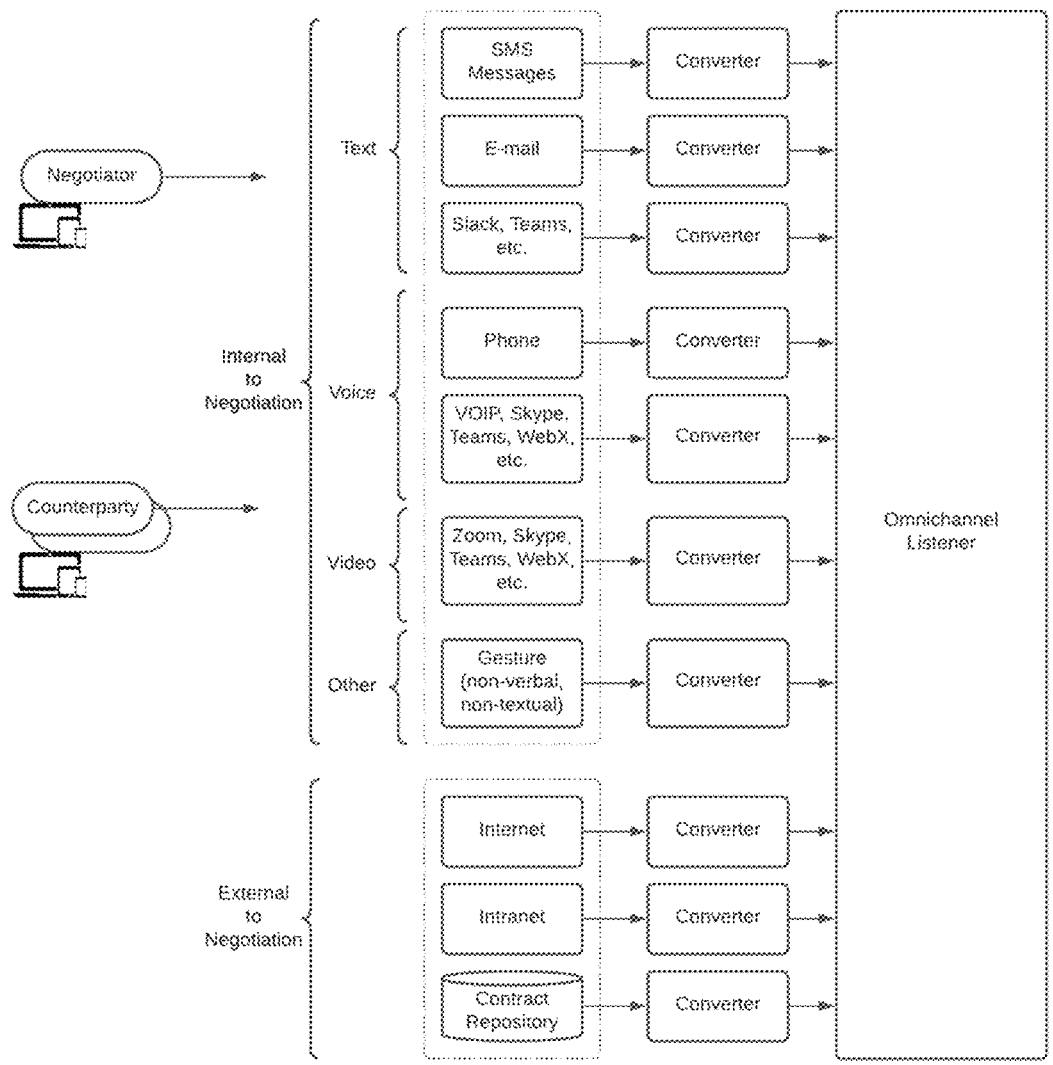
FIG. 12 is a schematic diagram of the omnichannel listener component.

As shown in FIG. 12, the omnichannel listener can accept any type of communication in any mode. Text inputs include but are not limited to SMS, email, Slack, Teams, etc. Voice communications include but are not limited to phone, VOIP, Skype, Teams, WebX, etc. Similarly, video inputs include but are not limited to Zoom, Skype, WebX, Teams, etc. The input communication channels can be aggregated into one platform (e.g., Teams, Zoom) or can be independent streams channeled into the omnichannel listener. Because the objective of the sentiment analyzer (described below) is to associate communications with terms from the term sheet, each input is segmented into separate lexical level tokens that have at most one term reference. E.g.:

Party A: "I like your price but we need to work on the delivery date." is segmented and inserted into the data stream as:
[Party A: I like your price]
[Party A: We need to work on the delivery date]
and is interpreted by the sentiment analyzer as "positive on price", "negative on delivery date". Sentiment need not be binary and can be dynamically configured to any set of emotion categories.

Non-verbal input can be included such as gesture and facial expression with appropriate sensors or could be included from the video input stream. In all of these cases, the input non-verbal communication is pre-processed into a token before it enters the omnichannel listener. Converting to a token makes it usable within the context of a communication data stream. E.g.:

Party A: We're prepared to offer you a unit price of $10.
Party B: [Signals an 'ok' sign with her hand]
Party B: "I want to talk about the delivery date." is inserted into the data stream as three tokens:
[Party A: We're prepared to offer you a unit price of $10]
[Party B: OK]
[Party B: I want to talk about the delivery date] and is interpreted by the sentiment analyzer as "positive on price", "neutral on delivery date".

An important part of this invention is to capture not only what a negotiator says but also how he/she says it because sentiment analysis can be an important factor in assisting the negotiator to a positive outcome. Therefore, any special formatting (e.g. bold, italics, all caps) used in text input is preserved for semantic and sentiment processing. Voice communications are converted (109) to text but are also analyzed for voice inflection, volume, and other indicators of sentiment. The audio track from a video stream is processed similarly, however the video itself is processed for facial expression, hand gestures, etc.

All input tokens (data entries) as described above are time sequenced by the time sequencer (110) to ensure that context associated with sequence is preserved. This is important here because negotiators may use multiple input modes. An email sent yesterday but received today while a real-time chat was occurring at the same time must be inserted into the time sequence in the context of the chat because that was when it was written. The invention uses send time stamps to sequence messages. Note, as described above, internal deliberations among members of the negotiation team are handled separately to avoid the possibility of private data leakage, but the two resulting data streams can be synchronized. This allows the intervention generator and other modules access to the context of any negotiation input or series of inputs.

The sentiment analyzer (111) then uses the data input stream from the time sequencer (110) and the term sheet (105) to associate each token with one or zero terms (and identify the topic if no term is present) and to determine the source's sentiment about the topic. Services suitable for sentiment analysis within the sentiment analyzer include Google Sentiment provided by Google™ LLC and similar.

The omnichannel listener also attends to external inputs on demand as directed by the intervention generator. Contextually sensitive data is retrieved using an external data fetch component (112). For example, two negotiators are talking about the mortgage rates associated with a real estate deal. The intervention generator may ask for external data on average and best mortgage rates being offered at that time. Once retrieved, this data, like all other data, is converted and time stamped and inserted into the data stream by the time sequencer. The same process applies to all local data (113) including, a contract repository (114) with metadata (115), the negotiation archive (116), and any other data repository (117) that is locally or remotely available such as an intranet, Customer Relationship Management (CRM), Contract Lifecycle Management (CLM), Enterprise Resource Planning (ERP), Procurement, document management systems, financial systems, and HR.

The sentiment analyzer (111) receives the time sequenced data stream and, using the term sheet, associates each entry in the data stream with zero or more terms in the term sheet. Entries that cannot be associated with a term in the term sheet are not discarded because they may provide further context during the negotiation. However, the system then applies the sentiment analyzer to each data entry that is associated with a term and computes a sentiment value for that term. For example, a negotiator says "I'm good with that price, but I'm going to need shipment sooner than that." As described above, this is separated into two tokens because there are two terms being discussed: PRICE and DELIVERY DATE and this party to the negotiation is positive on PRICE but negative on DELIVERY DATE. Common techniques for sentiment analysis will apply here and can include much more granular analysis than merely positive and negative but rather could include a wide range of sentiments that could be useful to the intervention generator in producing advice to the negotiator.

Figure 4:
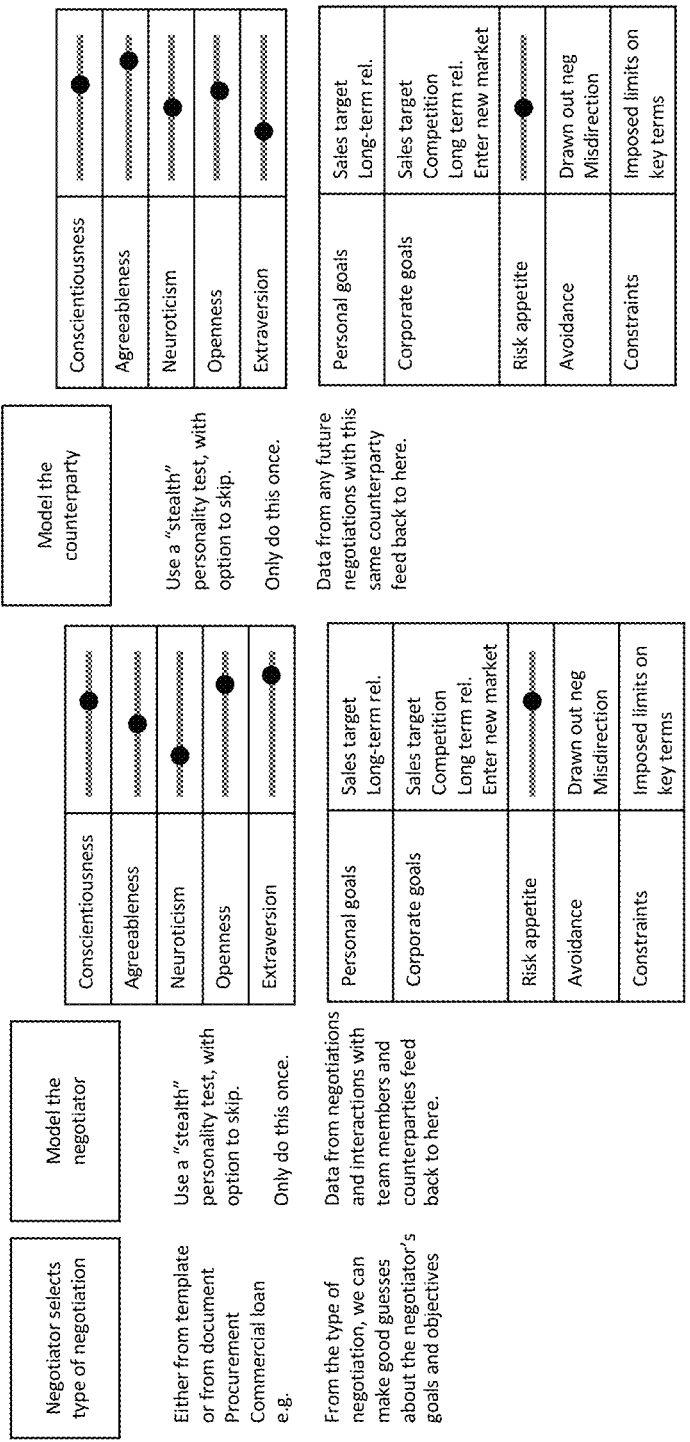
FIG. 4 shows a portion of the pre-negotiation phase and the events that occur during this phase.
Figure 5:
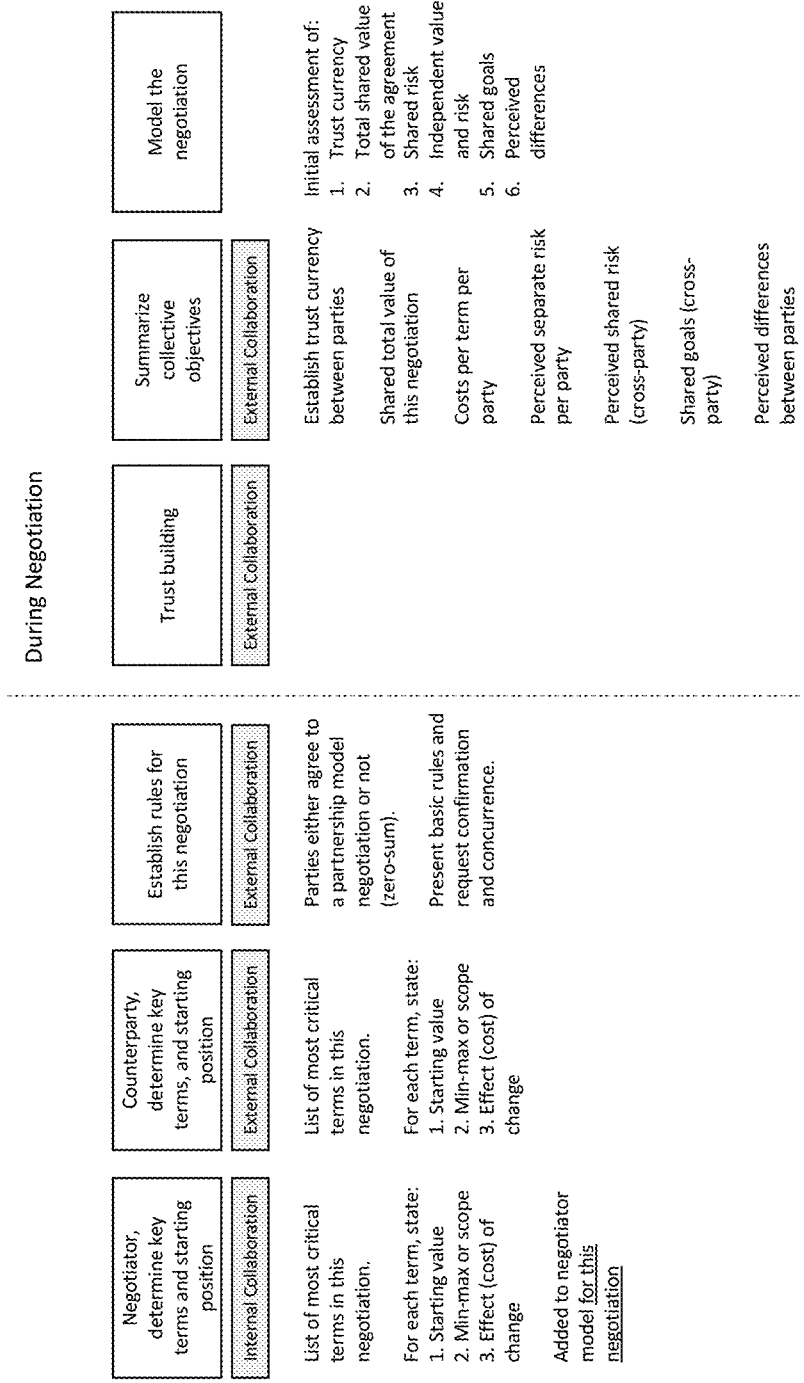
FIG. 5 shows the last portion of the pre-negotiation phase and the first portion of the during negotiation phase and the events that occur during these phases.
Figure 6:
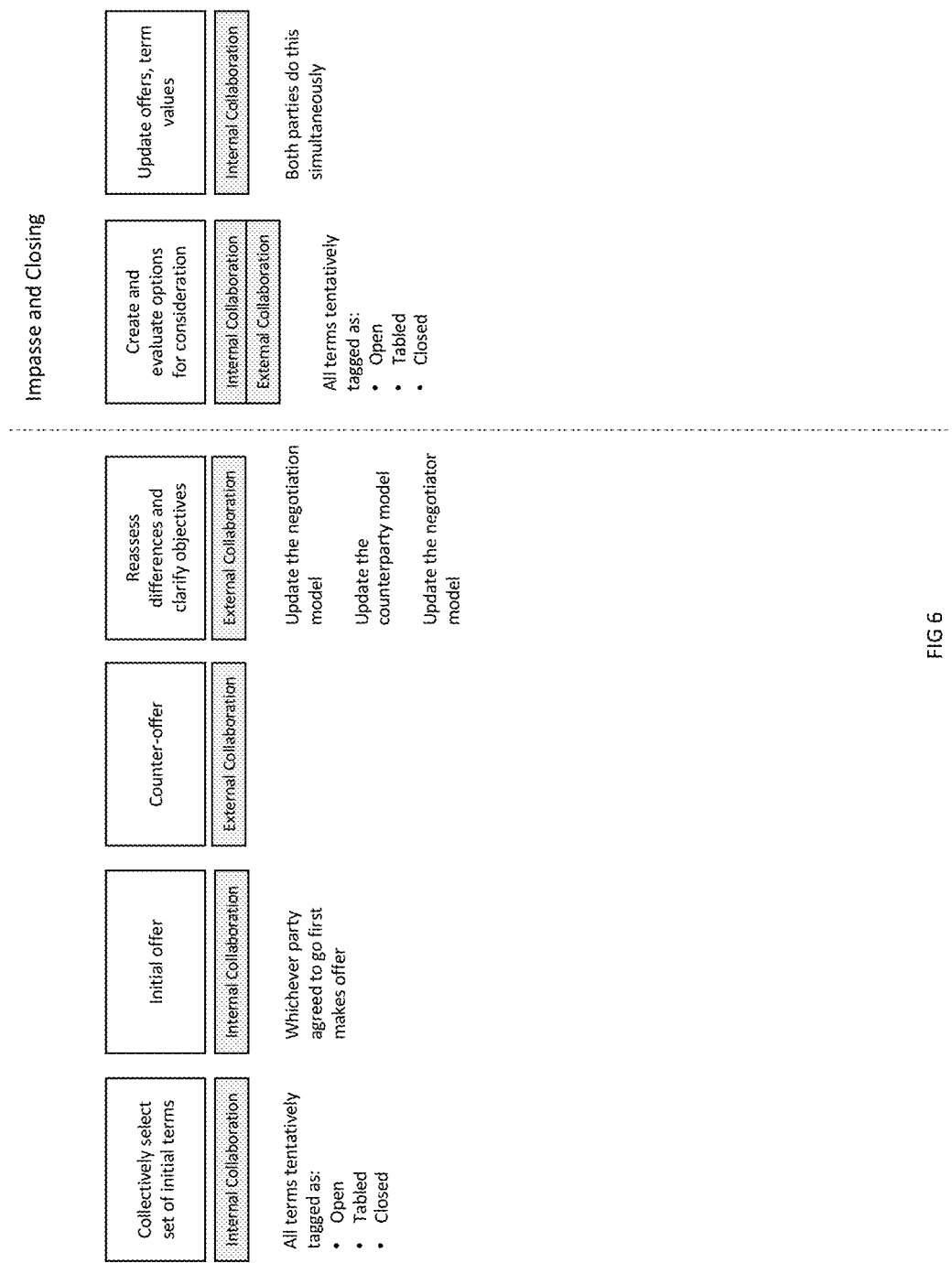
FIG. 6 shows the last portion of the during negotiation phase and the first portion of the impasse and closing phase and the events that occur during these phases.
Figure 7:
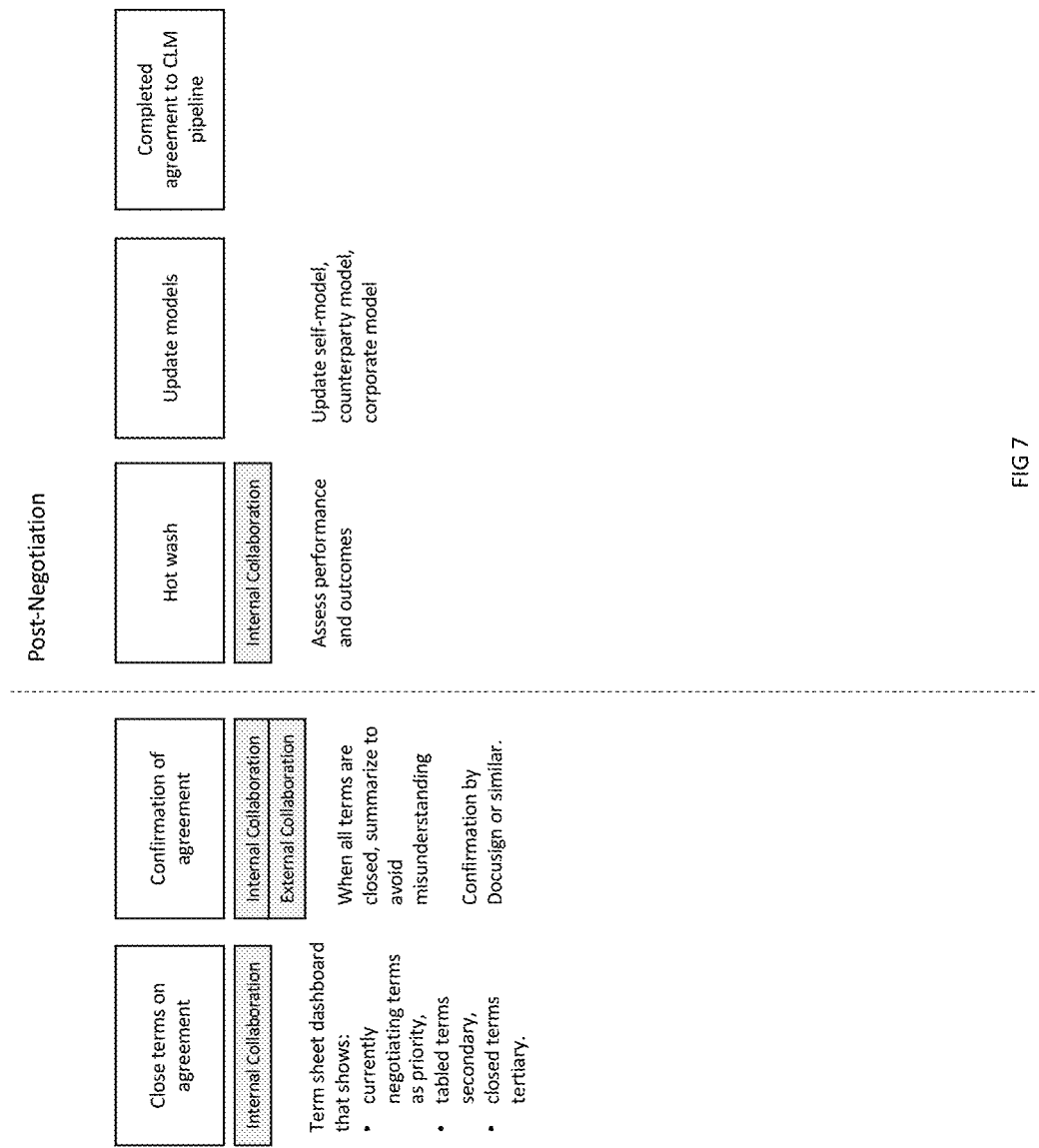
FIG. 7 shows the last portion of the impasse and closing phase and the post-negotiation phase and the events that occur during these phases.

The personality profiler (118) is a means for creating a model of the personality of a negotiator. The model can be based on any of the many theories on personality. The personality profiler can be explicit or indirect (i.e., "stealth"). There are a number of explicit personality profilers available, however most are too lengthy for use in this context and must be abbreviated for use here. An indirect profiler engages the negotiator on a number of topics and gleans personality measures based on responses. The results of the personality profiler could be, for example in a pseudo-Meyers-Briggs model, a series of "sliders" with values for conscientiousness, agreeableness, neuroticism, openness, and extraversion (see FIG. 4). The personality can provide input to the sentiment analyzer. For example, inputs from an extravert may be interpreted differently from an introvert.

The Intervention Generator

An important feature of the present invention is the intervention generator (119) (see FIGS. 1 and 2). An objective of the system is to provide time and context sensitive advice to negotiators to assist them in negotiating better agreements with counterparties. As such, two important enablers have been described above: (a) the auto-creation of a term sheet from a contract or communication data via the semantic term extractor (101), and (b) the omnichannel listener (108) that converts negotiation communications and related data into a data format that will allow the application of techniques such as machine learning, behavioral analytics, and game theory.

Each negotiation includes a model of the negotiator (120), a model for each counterparty (121), and a model of the negotiation itself (122). These are dynamic models that are updated over time and can be persistent (stored for future use) to enable learning from one negotiation to the next. A negotiator model (120 or 121) can be implemented in a number of ways. A dynamic data structure having fields for personality variables, past performance, tendencies, preferences, as well as up-to-the-moment tracking on the present negotiation (memorializing the negotiator's position on every term of the present negotiation over time) is a basic implementation. More complex variations are possible, including incorporating learning algorithms into the models that enable the model to infer new implied variables from explicit ones. Negotiator models are not required to contain all the same types of information. For example, information about a counterparty to populate the counterparty model may be limited to publicly available information and whatever can be gleaned from that person's interactions with negotiators. The intervention generator is designed to operate on whatever data it has even if that data is not the same for all parties.

The current negotiation model (122), similarly to negotiator models, can also be implemented as a dynamic data structure having fields for each term, historical values as each term changes over time for each negotiator, and a learning component that identifies trends in negotiation outcomes that directly inform constraints and guardrails (127).

Further embodiments include separate models for all members of the internal negotiation team. The negotiator model may include the output from an objective profiler (123) that queries the negotiator for his/her objectives of this negotiation. This can include both personal goals (e.g. a sales representative who needs to make a specific sales number this month) and/or organizational goals (e.g. we want to form an ongoing relationship with this counterparty).

The objective profiler measures the risk appetite (or risk tolerance) and targeted return (or hurdle rate) of the negotiator and/or the organization, based on past contract and negotiations and responses to queries from the profiler. Generally, the higher the perceived risk, the higher the expected return. The objective profiler also can create a value model as part of the negotiator model that includes economic value added (EVA) or similar computations of how to value the outcome of a negotiation.

The system can include a separate personality profiler (118) (described above) to produce personality information about a party. This can be done explicitly or implicitly. There exists a number of question-and-answer style interfaces to obtain this information, or the system can extract it from a series of responses to posed situations. The personality profiler can also benefit from external data sources such as LinkedIn, Twitter, etc.

A term valuation module (124) extracts information about how each party to the negotiation values the terms. This can be accomplished via numeric (scoring scheme) or ordinal (ranking) means and can be explicitly stated by the negotiator of inferred using a learning module. For example, a negotiator can be presented with the list of terms from the term sheet and can rank order them. They can provide their "top 5". They can be presented with a series of hypothetical agreements involving those terms and can respond with which they prefer, where the system infers preference from the responses. All of these methods allow for the extraction of priority based on value.

These term valuations can be used by the trade-off matrix (125) to determine alternate ways for a negotiator to achieve a desired outcome in the face of an impasse. There are a variety of ways to compute trade-off matrices (Ros, Raquel & Sierra, Carles. (2006). *A Negotiation Meta Strategy Combining Trade-off and Concession Moves. Autonomous Agents and Multi-Agent Systems.* 12. 163-181. 10.1007/s10458-006-5837-z.). A required input to the trade-off matrix is the relative valuations of the parties for each negotiable term. As a simple illustrative example, buyer cannot exceed $10 per unit, seller's lowest price is $12 per unit. This is an impasse that could potentially end the negotiation as a failure. However, if the trade-off matrix knows that the buyer values delivery date less than the seller, a potential trade-off might be to offer a longer delivery date in return for a discount on price. This is only possible if the trade-off matrix knows the relative values each party places on negotiable terms. Outputs from the term valuators and the trade-off matrix are sensitive and must be handled with appropriate security. They are private to their respective negotiator.

Term valuation allows for the computation of the negotiator's BATNA (Best Alternative To a Negotiated Agreement), WANTA (Worst Alternative To a Negotiated Agreement), and ZOPA (Zone Of Possible Agreements) which lies between them. Depending on available data from the counterparty, estimates of the counterparty, BATNA, WANTA, and ZOPA are also possible and desirable. The range of values for key terms is calculated from historical analysis of past negotiations and contracts and current market conditions. All of these values are used to develop the trade-off matrix that informs the intervention generator and game theoretic model in proposing offers and counteroffers.

As stated above, the negotiation model is also dynamic and includes all data relevant to this negotiation. It maintains a history of offers, counteroffers, and links to the communications of the parties that led to those offers and counteroffers. Historical data including communications of the internal negotiation team are also captured to the negotiation archive (116) which is not only important as a data source for future negotiations, but also is a critical asset for internal and external compliance and auditing. It can be important to review a negotiation to identify issues with the flow of information or other ways a local negotiation team can improve on future negotiations. With the ways that agreements are currently negotiated, all of this data is either lost or preserved in a form that does not facilitate learning. The present invention addresses this shortcoming. The negotiation model also maintains a history of all interventions presented to the parties and maintains all data in a time sequenced format for further processing, such as mining for trends and extracting constraints and guardrails.

A feature of the invention is that it is easily integrated with existing CRM, CLM, ERP, Procurement, and similar enterprise software and document repositories as data sources for the intervention generator. Furthermore, as agreements are reached when all open terms are closed, the system can integrate with signing software such as DocuSign and the resulting executed contract can flow seamlessly from negotiation to contract management.

Contracts in the contract repository typically contain "redlines" which include changes made to the document during negotiation (often tracked by the word processor) and comments. All of this data is made available to the intervention generator for historical modeling. Redlines and document comments are helpful but insufficient as a negotiation platform for several reasons, including: (1) They pertain only to written language and ignore all the other communication modes that are ubiquitous in negotiation, (2) Because they only pertain to written language, historical data contained in a redline document is likely to be incomplete because aspects of the negotiation happened outside of the document, and (3) They cannot relate one part of a document to another (e.g., term A is positively related to term B). Therefore, redline documents are complementary to the present invention but are insufficient as an alternative.

The intervention generator also uses a referent negotiation model (126) to guide and direct interventions towards an improved outcome. There are similarities here to intelligent tutoring systems where a trainee model, an instructor model, and a referent pedagogical model are used to identify appropriate learning interventions that improve or accelerate the learning of the trainee. Here, the referent negotiation model includes information pertaining to best practices of negotiation (see above) and is therefore connected to the best practices repository (132). The referent negotiation model also has access to any constraints and guardrails (127) associated with this negotiation. Constraints can be "hard caps" that are either internally or externally imposed on the negotiation. For example, there are SEC rules that must be adhered to. These are constraints. But the local VP of Sales, for example, might have a local rule setting a hard lower cap on price. This is also a constraint. Guardrails can be considered "soft caps" because they can be broken but the negotiator should be alerted. For example, "we don't like to offer more than 5% discount." Is a guardrail. Some guardrails can be extrapolated from the negotiation best practices.

The best practices repository (132) can be implemented in several ways. It can be a basic rule set consisting of if-then statements that trigger new assertions. It is intended to be a dynamic repository or container of best practices that are locally determined. As stated above, there are no universal rules for negotiation. They can also adapt over time and be updated dynamically. Because the system maintains an archive of negotiations (116), the intervention generator can calculate personal and organizational performance against the best practices rules. As an illustrative example, John Smith performs well with building trust with his counterparty, but not as well in understanding and extracting his counterparty's objectives. The same can be calculated across the entire sales team.

All of the above components provide inputs to the intervention generator module (128), within which resides the logic for what interventions will be generated and when they will be generated and presented to the negotiator. An important component of the intervention generator is the game theoretic model (129) that works in concert with the trade-off matrix to produce suggested offers to the negotiator. The game the theoretic model uses a min-max algorithm or variation thereof to search for the best offers that will move the negotiation towards an improved outcome for the negotiator. As such, heuristic functions are important as they measure the relative "fitness" or "goodness" of one position over another. The game theoretic model can use a simple single heuristic approach or may include a multi-heuristic approach that balances different aspects of a current position. For example, a heuristic that optimizes on value extracted from the agreement may run counter to a heuristic that optimizes relationship with the counterparty. If one of the negotiator's objectives (123) is to develop a long-term relationship with this counterparty, then maximizing value may not be the best choice. Alternatively, if this is likely to be an isolated transaction with no repeat business, then the reverse may be true.

Inputs to the game theoretic model include but are not limited to statistical models of past performance of (a) the negotiator, (b) the counterparty, (c) the counterparty's organization, and (d) industry trends. Note that the intervention generator has direct access to all of the external data services shown in (113). The model computes the possible next "moves" in the negotiation for the negotiator and corresponding next moves for the counterparty. Heuristic value functions are applied to the outcomes and recommendations are selected from the best outcomes.

Further embodiments of the game theoretic model include the input of negotiation best practices into the heuristic function such that the outcome producing the best overall value to the negotiator is not necessarily always the recommended offer because best practices can value other aspects of the negotiation other than financial. Any variable can be included in the heuristic function that is used in the min-max algorithm thereby allowing the intervention generator to be ultimately flexible in what it recommends.

Additional embodiments also include a behavioral analyzer (130) that further analyzes the behavior of the negotiator or counterparty that can include statistical models of past performance within negotiations, not only considering the outcome. This is only possible because the present system maintains the negotiation archive (116) that includes all inputs textual, verbal, and non-verbal in the time-sequenced data stream for the negotiation. Therefore all this data is available for analysis that can include, for example, analyzing body language or facial expression to determine if the counterparty is being honest or not, or their emotional state, possible anxiety, etc. There exists component solutions for each of these that can be integrated here.

As disclosed below, the intervention generator not only produces time-sensitive interventions, but also time-dependent interventions. Time-sensitive interventions are those that are contextually linked to the negotiation data stream as it occurs. Examples include an initial term set to begin a negotiation, a reminder to revisit a tabled term, and a reference to a time-sensitive external event, such as a recent increase in the lending rate. Time-dependent interventions are those that are directly coupled to the interactions between the negotiators. They are interventions that are only helpful within a time window of the negotiation. Examples include, "The personality profile of your counterparty suggests that you set a deadline of tomorrow morning to respond to your offer.", or "The pace of this negotiation has slowed. The counterparty may be losing interest. Suggest that you make a new offer today."

The intervention generator, as its name implies, generates interventions. The following section will illustrate what those interventions might be. Furthermore, there are also insights that may be less time-dependent but that are also enabled by the data stream provided by the omnichannel listener.

Negotiation Data Collection and Sources

The intervention generator has access to, but is not limited to, the following input data sources. All of these are identified in FIGS. 1 and 2.
- The term sheet for this negotiation
- The negotiator model, including any models for members of the negotiator's team
- The counterparty model
- The referent negotiation model
- Term valuations and trade-off matrices for all parties
- All communications associated with this negotiation in the form of the time sequenced data stream (see above)
- External data as indicated above Furthermore, the negotiation archive includes past data from previous negotiations that can be used with conventional AI/ML techniques to provide insights to the negotiator. The data that the present invention enables with respective sources includes, but is not limited to:

- Negotiated terms. Not all terms are negotiated or negotiable. The archive retains lists of terms that have been negotiated and a statistical profile on each term. E.g., "You negotiate indemnification on 60% of your contracts."
- Negotiated term values. For executed contracts, the archive retains historical data on values associated with each term. E.g., "For this item number, your high price is $X, you low price is $Y, and your average price is $Z." Because the system collects all term values, all descriptive statistics on said values are also available, such as variance, standard deviation, etc.
- Sequence of terms negotiated. In the context of every negotiation, the behavioral analyzer monitors when terms are negotiated and in what order. E.g., when a negotiator repeatedly seeks to increase term X when term Y is decreased, the behavioral analyzer may infer an inverse dependency between X and Y.
- New terms. These occur when a negotiator introduces a new term that was not present in the original long-form contract.
- Iterations on terms. Within the negotiation team's internal deliberations, how many iterations or time was spent discussing what to offer or counteroffer on any specific term? Within the negotiation with the counterparty, how many iterations or time was spent negotiating any specific term?
- Time to close a term. Closing a term occurs when all parties have agreed to its value. How long (time and/or iterations) did it take to close any specific term?
- Time to close negotiation. A negotiation is closed when all negotiated terms are closed and all parties confirm acceptance of the entire agreement. How long (time and/or iterations) did it take to close any specific negotiation?

Negotiator Interventions and Insights

There are two types of interactions with the negotiator of concern: interventions and insights. Interventions are embedded into the negotiation itself (i.e. they are "pushed"). These are commonly (but not always) time-sensitive (or time-dependent, see above). Insights can be time-sensitive if they are presented as interventions (i.e. they are pushed to the negotiator within the context of a current negotiation), but are often not time-sensitive (i.e. they are "pulled" by the user as needed).

Interventions and insights are generated in real time during the negotiation. When possible (e.g. during chat and email communication modes), the intervention occurs before the communication is made to allow the negotiator to amend her communication before it is sent.

- Negotiator makes a statement in chat that could be an SEC violation.
- Negotiator submits the message to transmit.
- The transmission is intercepted by the omnichannel listener, analyzed and placed into the time sequence data stream.
- The intervention generator identifies the potential problem.
- The intervention generator alerts the negotiator of the potential problem and suggests a repair. [Note, the message has not yet been transmitted]
- Negotiator can accept the repair, author their own repair, or override and retain the original message.

If the original message was retained, it is now transmitted to the counterparty (it already appears with analysis in the negotiation data stream).

If the negotiator accepts the repair or authors her own, the new outgoing statement is intercepted and analyzed and the process repeats.

This technique works only in "turn-taking" communications such as chat and email and would not be suitable for phone calls and video interactions. However, the analysis will still be performed and the alerts will be presented to the negotiator, albeit not before transmission to the counterparty.

Because interventions are meant to align with negotiation best practices, they will be presented with the practice they are linked to using the example list of principles presented above. This is a representative, non-limiting list.

Interventions

[Negotiation Principle] Build trust between yourself and your counterparty.
  Find uncommon commonalities between the parties and suggest topics to get to know the counterparty. Advise on topics to avoid. Intervention generator searches for publicly available data on the counterparty and identifies topics in common with the negotiator. Examples: "You and the counterparty both went to college in NYC."; "Your counterparty dislikes Acme Inc. Try to avoid offering Acme products." The data supporting this feedback is located in publicly available sources via the external data fetch module as well as in the negotiation archive.
  Do not react to emotional outbursts and avoid them yourself. The intervention generator monitors via sentiment analysis, communications from the counterparty and can institute a delay in outgoing messages. Outgoing messages are analyzed and if determined to be emotionally charged, an alert is sent to the negotiator, potentially with a reworded response.
  Trust currency (Glaeser, Edward, David Laibson, Jose Scheinkman, and Christine Soutter. 2000. *Measuring trust. Quarterly Journal of Economics* 115(3): 811-846.) is a means for measuring the value of trust between negotiators in tangible terms. Interventions intended to build trust can be quantified in terms of their positive affect on the outcome of a negotiation.

[Negotiation Principle] Know yourself. Know what you are trying to accomplish.
  Understand your goals. With input from the negotiator's term valuation and initial objectives (from the objective profiler), inform the negotiator model(s) of both the personal and organizational goals related to the present negotiation. Some of these goals may be specific to this negotiation (e.g., I need to close this deal by July 1), and others may be long term and contextual (e.g., We need to increase our sales by 10% this year). Create a model of the negotiator's BATNA, WATNA, and the corresponding ZOPA that lies between WATNA and BATNA. The objective profiler gathers information specific to the current negotiation and the negotiation archive retains historical data on past negotiations from which goals can be extracted.

[Negotiation Principle] Study and understand your counterparty.
  Understand your counterparty's goals. Corporate goals are attained through publicly available data about counterparty company and their industry, public financial reports, and the negotiation history with this counterparty company and the counterparty negotiator stored in the negotiation archive. Personal goals include the counterparty's BATNA (to the extent that it can be extracted from conversational dialogue) and publicly available data about the counterparty negotiator (e.g., LinkedIn, Zoominfo, Twitter). The intervention generator identifies priorities and associated confidences about those priorities based on stochastic models. These are included in the counterparty model, provide inputs to the counterparty term valuator and consequently affect the trade-off matrix.

[Negotiation Principle] Leverage the differences between you and your counterparty.
  Determine objective criteria to evaluate this negotiation and the resulting agreement. Outside of the individual and separate objectives of the parties, determine what objective metrics can be applied to the current negotiation to assess it. The invention queries the parties to determine if value, speed to close, risk reduction, or other measures apply to this negotiation and to what degree and these metrics are used to provide real-time feedback to the negotiators about the measured progress on this negotiation.
  Invent options for mutual gain. The trade-off matrix uses the values placed on each term by each party to the negotiation to compute and recommend trade-offs. The intervention generator recommends alternate combinations of adjusted term offers.
  Real-time risk/value analysis. Based on the ongoing negotiation, model and compute risk and value (for both parties) in real time. Both risk and value are quantitative, but usually not precise. See EVA above. The intervention generator uses heuristic functions to compute risk and value scores based on known terms. For example, risk can be associated with delivery date, manufacturing, indemnification, etc. Value can be associated with price, warranty, etc. The intervention generator suggests to negotiator ways to lower risk and raise value.
  Negotiation Guardrails and Constraints.
  Negotiation constraints. These are hard barriers that must be strictly enforced. They can be:
    Internally imposed (e.g., Never agree to a delivery date less than 14 days from close of contract"), or
    Externally imposed, typically by a law, or rule governing the industry (e.g., Official example: "Industry rule states that you may not exceed _____". Industry compliance examples: financial services— PCI, SEC, Finra, or HIPAA for healthcare.)
    In some industries, there are also non-negotiables; terms that are important and necessary but cannot be negotiated. Both parties must agree to them. The intervention generator will alert the negotiator when a constraint has been exceeded, and may also alert the negotiator when an offer is within some nearness threshold of the constraint.
    In some cases, statements made by a negotiator can be inferred to be a violation of a regulation. For example, in a real estate deal, a negotiator says to the counterparty, "I guarantee this property will have a 10% return next year.". Statements guaranteeing return on investment are an SEC violation, therefore the intervention generator can alert the negotiator and suggest a change in the language.

Negotiation guardrails. These can be considered "soft" constraints, where the negotiator needs to be made aware. Examples include:

Corporate ("We don't like to go below 2% margin")

Personal ("I prefer to limit shipping costs to _____")

Precedent: Treat all counterparties the same

Situational: Any guardrail imposed by the current situation. This can be triggered internally using internal (non-public) information, (e.g., logistics says that supply of part X is limited, therefore delivery dates will be impacted), or it can be triggered externally using external (public) information, (e.g. The Suez Canal is currently backed up, no ships will get through for 30 days.). Offer a realistic delivery date or offer another option (term) in exchange based on the trade-off matrix.

Compliance. In many industries compliance can be a costly endeavor especially when it is addressed after the contract is closed. The present invention, via constraints and guardrails, assures that compliance standards are met during negotiation.

Communications Velocity, Volume, Sentiment.

Based on the personality profiles of the parties and the context of the negotiation, with optional input from outside influences (e.g., we need to close this deal fast because gas prices are expected to rise sharply soon).

Advise the negotiator with regard to the pace of the negotiation. "Make the offer today and follow up tomorrow morning. You should maintain a sense of urgency to close this deal." Or "Give the counterparty time to think about the offer. Don't respond until next Monday.".

Identify trouble terms before they escalate into an impasse. Separate real differences in position from "red herring" differences used as negotiation tactics to get something in return.

Monitor the dialogue between parties. Advise the negotiator how to respond based on interpretation based on the velocity, volume and sentiment of communications. For example, Does the fact that communications slowed down from every hour to once every other day mean less interest? Does the "tone of voice" mean a change in sentiment about the deal? Does the decrease in volume of communications indicate a loss of urgency?

Insights

Referring to section Negotiation Data Collection and Sources above, the following insights are enabled by the present invention. As contracts are executed and stored in a contract repository with associated contract metadata, the present invention also associates all the negotiation data for that contract that is used (a) for context on that agreement, (b) for litigation purposes (e.g., who said what and when?), and (c) for extracting insights that cross agreements to assist in future agreements. This list is meant to be representative and non-limiting.

Insight analytics can be upstream or downstream. Downstream analytics are intended to improve sales forecasting, improve procurement, production planning, and supply chain management, as well as improved cash forecasting for debt, investment, sales, and procurement negotiations. Upstream analytics provide input to corporate policy, standardization of processes and use of legal terms across the enterprise and the industry.

Real-time corporate forecasts. To produce superior forecasts of what is likely to be completed by a specified date or time, the intervention generator uses a regressor with data from time to close terms and negotiations associated with specific negotiators to predict which open negotiations will close by a specific date. The estimated value of the closed contract can be estimated as well as predictive likelihood of outcome, time to supply and deliver, and the probability that the corporation will or will not meet market expectations.

Contract efficiency. This metric is more about the end result than the process and therefore leverages contract metadata mode than the negotiation archive. It considers contract value, post-contract disputes and litigation, renegotiation rate, default rate, and percent of contract value realized.

Negotiation efficiency. This metric is based on the negotiation itself rather than the outcome. Correlating negotiation efficiency and contract efficiency is also an important insight enabled by the present invention. Negotiation efficiency can be measured at a corporate (organizational) or personal level. It considers average time to close, success and failure rate, internal workflow inefficiencies, average response time, and peer reviews and ratings.

Term dependencies and guardrails. Both term dependencies and guardrails can be manually set. However, the present invention also can learn them from negotiation history. Term dependencies appear when a negotiator tends to negotiate term B shorty after negotiating or modifying term A. Furthermore, term dependencies can be binary (absent or present), they can be directional (A is positively dependent on B), and they can be vectors (A=cB, where c is a constant). Guardrails, like dependencies can be explicit or inferred from negotiation data but are soft constraints, meaning that the alert presented to the negotiator is a warning that a guardrail has been met or exceeded.

Industry trends within the context of negotiation performance (either personal or corporate) are either collected or computed from the negotiation data. Standards associated with specific terms can also be guardrails or constraints. Average term values and trends in values as well as changes in values during negotiation can be calculated from the negotiation data (e.g., "Your average price on item #123 is $10 and is trending up over the past month. Your average starting price prior to negotiation is $15."). Market forecasts within the context of local corporate or personal forecasts can be computed and compared to corporate or personal trends. Also, industry benchmarking with comparisons to personal or corporate performance are possible.

Negotiator efficiency is a metric specific to a negotiator but could be aggregated to a group or organization. It measures how quickly the negotiator closes a deal (time between opening negotiation and closing the deal), how close the negotiator came to expected margins, how many negotiations resulted in executed contracts that meet or exceed a value expectation.

The Learner

The current invention utilizes conventional machine learning techniques in several components. However, it applies unique corpora to the respective classifiers or regressors that are enabled by the invention resulting in novel features. The Learner appears in several places in the architecture as designated by L in FIGS. 1 and 2. Most of the learning features are supervised and reinforcement feedback is applied when possible. The generic learner as described above is shown in FIG. 8.

The semantic term extractor (described above) that processes input contract documents uses a hybrid rule-based and ML approach. It receives a document and also the contract ontology that provides a roadmap to all types of contracts. Initially, the implementation is rule-based with rules aligned to the directions of the ontology. However, as documents are processed, the resulting term sheets are initially manually proofed thus creating a classified contract data set aligned to the ontology that is used by all subsequent input contracts.

The sentiment analyzer also uses a hybrid rule-based and ML approach. Here, the corpus is the time sequenced negotiation data stream. The sentiment analyzer first segments the input data streams into single topic phrases. Each phrase is then analyzed for sentiment with the term sheet used for context. For example, if the negotiator says "Your cost is too high." The sentiment analyzer is able to equate "cost" with the term "price" and "too high" as a negative sentiment. The distinct sentiments that the sentiment analyzer is capable of producing can be informed by the personality profiler or can be manually determined prior to use.

Figure 13:
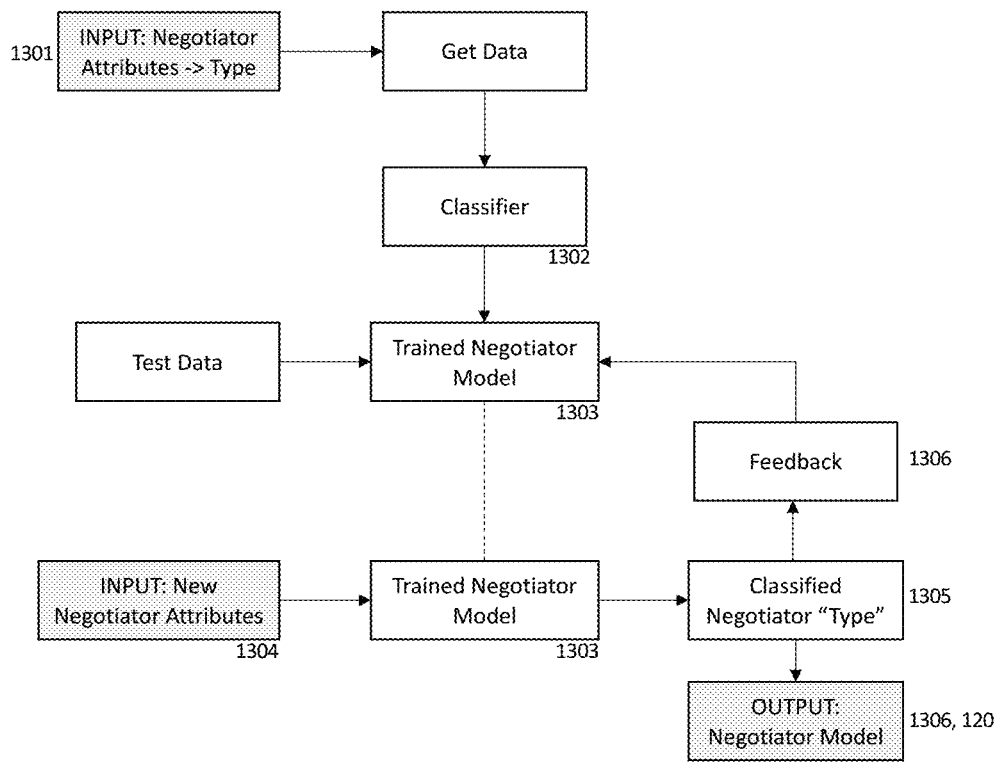
FIG. 13 shows the ML process applied to the intervention generator to analyze the negotiator type.

The learner is also used to determine the type of negotiator that affects the negotiator model. FIG. 13 shows the corpus (1301) as input negotiator attributes (that may in part be a personality profile). The classifier (1302) then produces a trained negotiator type model (1303) that can be tested. When deployed, new negotiator attributes (1304) (possibly from the personality profiler (118)) are applied to the trained negotiator type model (1303) that identifies this negotiator's type (1305) according to predetermined negotiator types, with a feedback loop (1306) to the trained negotiator type model to improve over time. The negotiator type is then integrated into the negotiator model (1306, 120)

Figure 14:
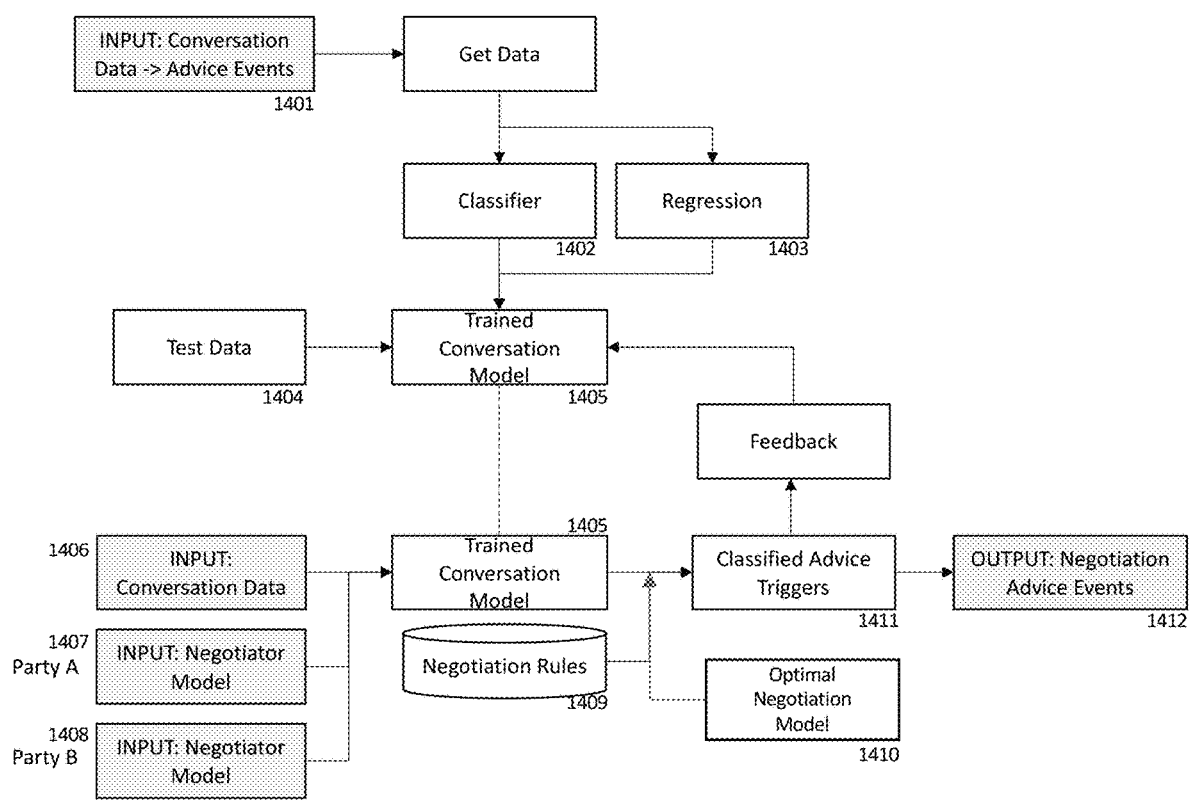
FIG. 14 shows the ML process applied to the intervention generator to produce interventions for the negotiator.

The learner is also used in the intervention generator as shown in FIG. 14. Here the corpus is negotiation data from the omnichannel listener (1401). Using a classifier (1402) or regressor (1403), a testable (1404) trained negotiation conversation model (1405) is produced. When deployed, the trained conversation model is coupled to the input negotiation data stream from the omnichannel listener (1406), as well as the negotiator model (1407, 120) and the counterparty model (1408, 121). The intervention generator uses a hybrid approach that combines negotiation best practice rules (1409) as well as the referent negotiation model (1410, 126) to identify advice triggers (1411) that are presented to the negotiator (1412).

Description of Embodiments

The preferred embodiment is shown in FIG. 1 (To avoid confusion, FIGS. 1 and 2 share the same numbers that identify the individual components. FIG. 1 is the preferred embodiment and FIG. 2 is the same but includes advanced features and functionality.) The three primary components include the semantic term extraction component (101), the omnichannel listener component (108), and the intervention generator component (119). The semantic term extractor component includes the contract ontology (104) and the semantic term extractor module (103) that performs the extraction, resulting in the negotiable term sheet (105).

The omnichannel listener component includes the converters (109) for converting all negotiation input into tokens and placing them in the data stream. The time sequencer (110) assures correct temporal ordering and the sentiment analyzer (111) uses the time sequence and the term sheet to produce the contextual data stream that informs the intervention generator component (119). The intervention generator component includes negotiator (120), counterparty (121), current negotiation (122) and referent negotiation (126) models. There are term valuators for each of the party models (124) that inform the trade-off matrix (125) that provides input to the intervention generator module (128) that includes the game theoretic model (129).

Figure 15:
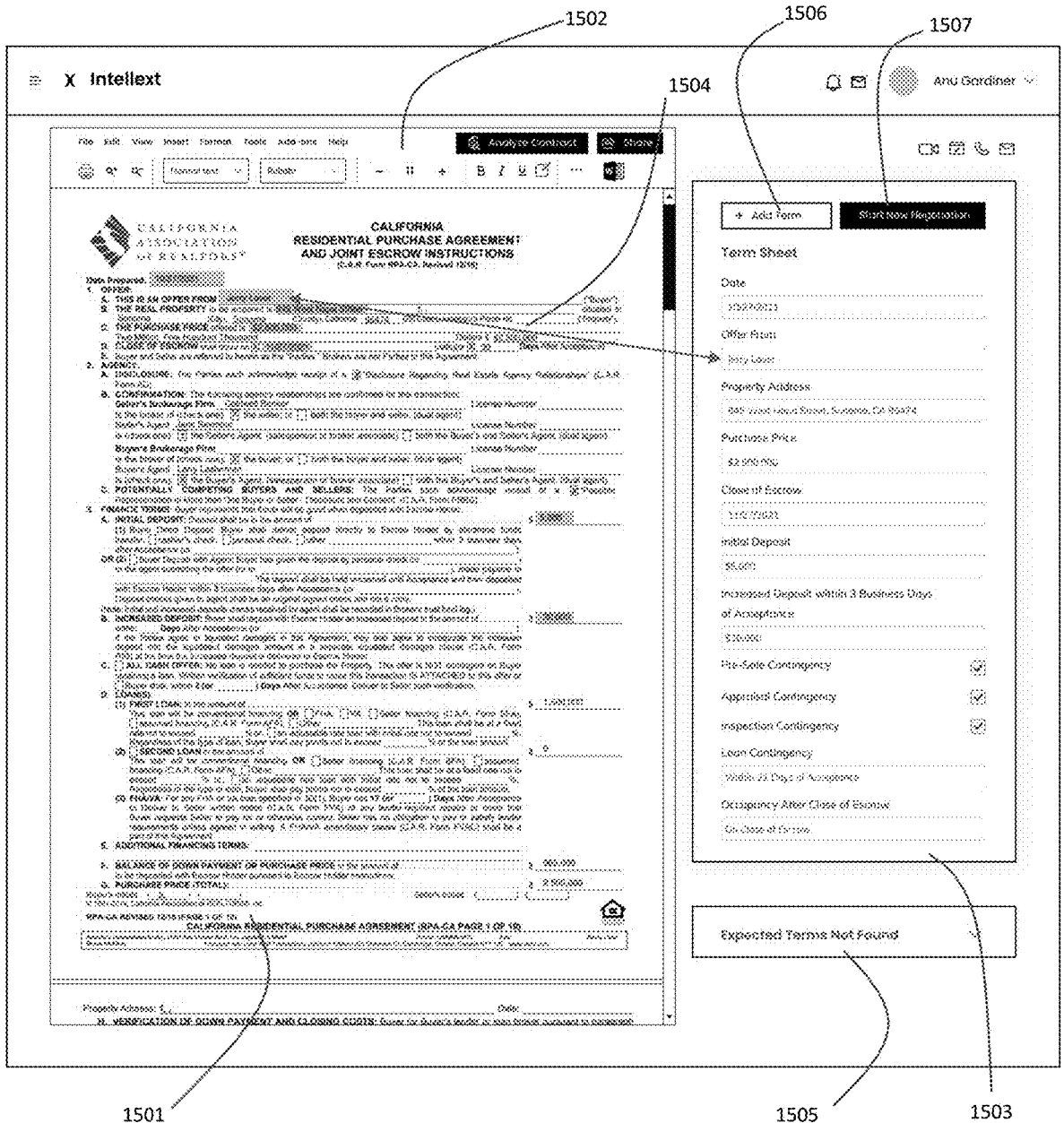
FIG. 15 shows the semantic term extractor implemented as a word processor plug-in, with the contract and associated term sheet.

FIGS. 15-19 show an implementation of the invention into a practical application. In FIG. 15, a contract has been loaded into the semantic term extractor component. In this embodiment, the original contract document (1501) is presented to the user in the native word processor (Microsoft Word in this case) (1502) where the semantic term extractor is implemented as a plug-in to the word processor. The term sheet (1503) is presented to the right with each term highlighted within the original contract (1504). The term sheet is presented as terms (as they appear in the contract ontology) with their respective values (as they appear in the contract itself). At the bottom of the term sheet, expected terms that did not appear in this contract are listed (1505). Because the semantic term extractor does not necessarily produce perfect term sheets, the user has the ability to add terms (1506). This is transmitted back to the learner in the semantic term extractor in a feedback loop for its supervised learning model. When the user is satisfied with the term sheet, she begins the negotiation (1507).

Figure 16:
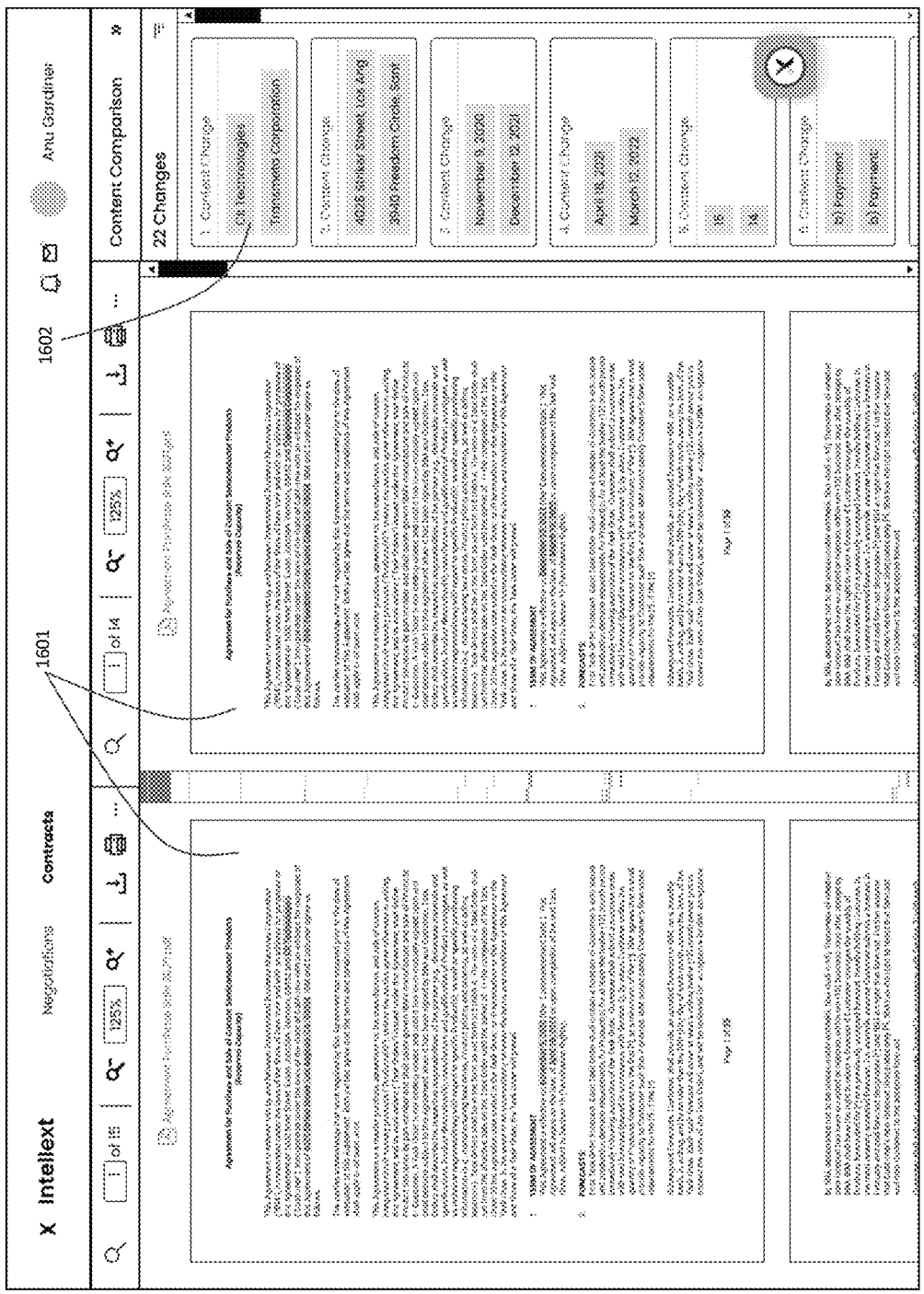
FIG. 16 shows the semantic term extractor comparing two documents for term value changes.

In FIG. 16, the semantic term extractor analyzes multiple contracts for comparison purposes at the term level. The semantic term extractor receives at least two contract documents (1601), extracts all the terms, and presents changes to the user (1602). This aspect of the system is important when a user of the present invention is negotiating with a counterparty who is not using the invention (see FIGS. 22 and 23).

Figure 17:
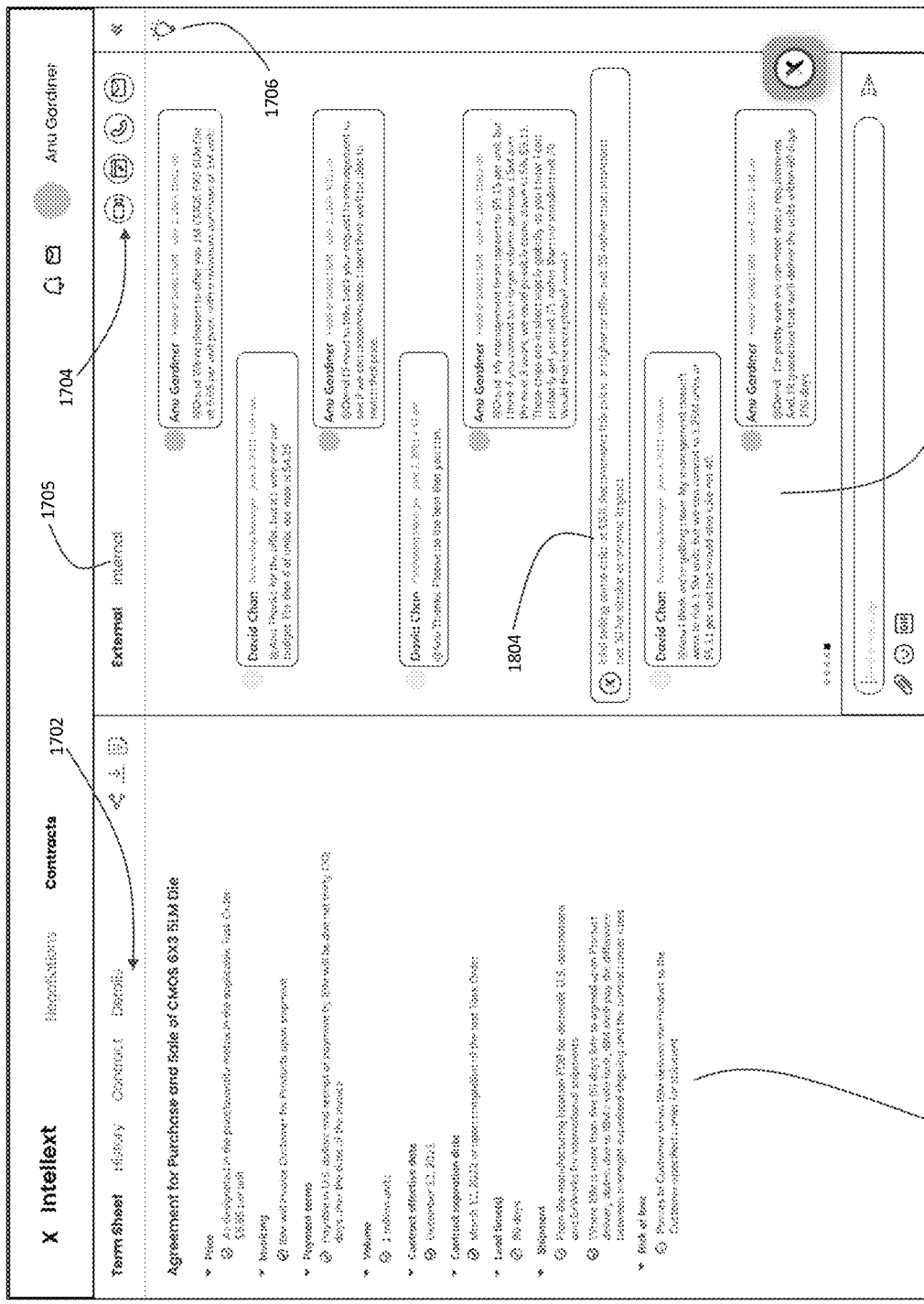
FIG. 17 shows the negotiation platform with the term sheet on the left and a chat channel input to the omnichannel listener on the right.

In FIG. 17, the negotiation has begun. The term sheet that was extracted from the semantic term extractor is presented in the left column (1701). As the term sheet is the working document that represents the negotiation, the invention tracks the history of all changes, links to the original contract (to allow the user to flip back and forth between term sheet and contract), and presents the details (metadata, 106) of this contract (1702). The negotiation occurs in the right panel (1703). Shown here is the external negotiation between the negotiator (here, Mr. Chan), and the counterparty (here, Ms. Gardiner). The omnichannel listener includes the chat channel (see here) as well as video, audio (phone), and email as well as a calendaring tool to schedule synchronous communication events (1704). The internal negotiation teams' communications (1705) are similar in function and appearance but must remain separate to ensure the privacy of internal deliberations and communications. All of these are time synchronized and inserted into the communication thread shown in the main panel (1703). The intervention generator, in this example, uses external data to produce an alert to Mr. Chan that the item he is buying is available at $5.11 per unit from another vendor and suggests what Mr. Chan should do in his next counteroffer (1704). The third panel (1706) opens to show insights relevant to this negotiation.

Figure 18:
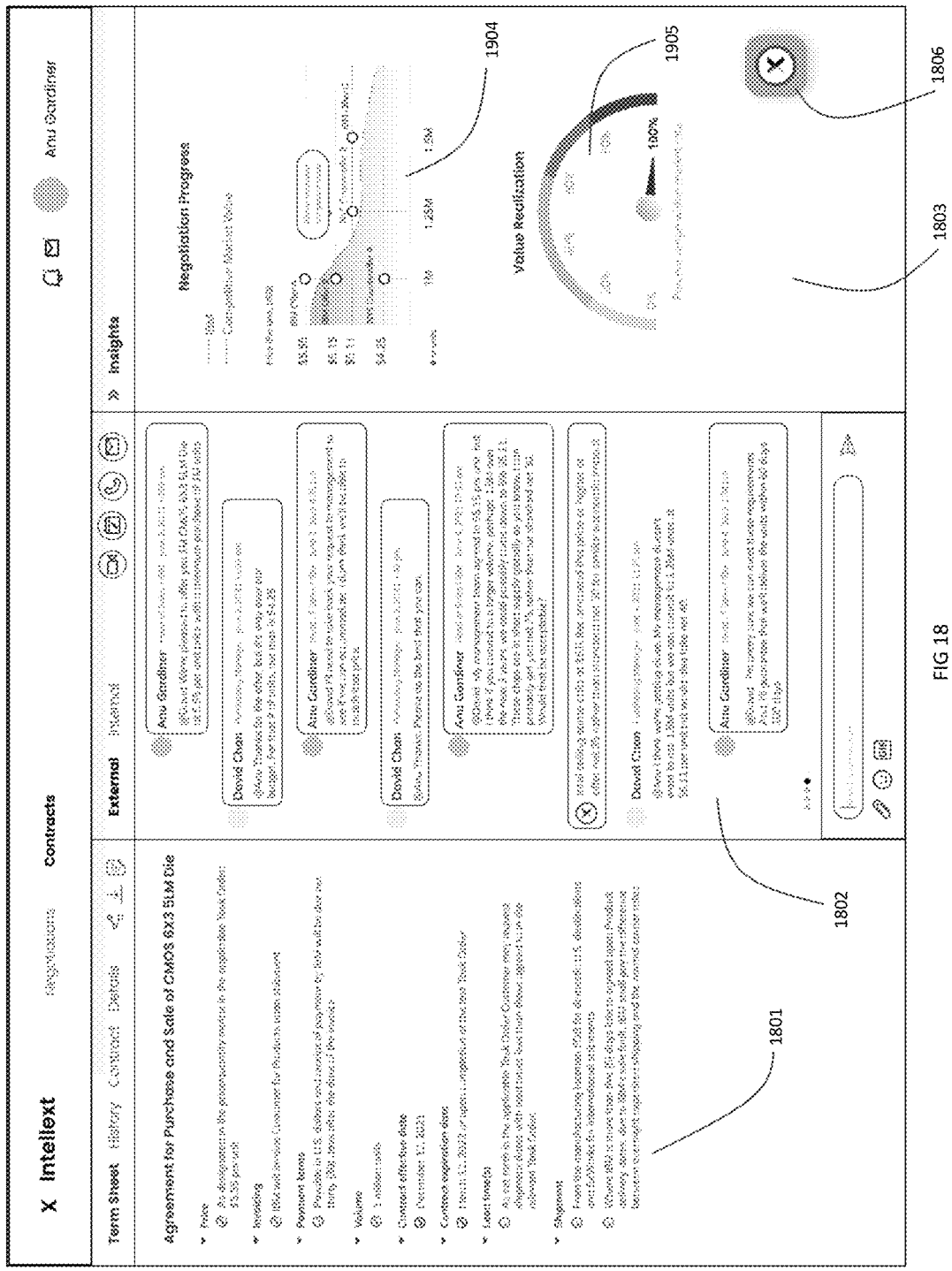
FIG. 18 shows a third component of the negotiation platform, the insights panel.

FIG. 18 shows the term sheet in the left panel (1801), the current negotiation in the center panel (1802), and insights in the right panel (1803). In this example, the intervention generator produced insights about the counterparty corporation compared to the competitive market (1804), and a value realization estimate based on the current status of the negotiation (1805). The system includes a negotiation assistant bot (1806) that is implemented as an automated NLP chatbot linked to the intervention generator which allows the system to answer inquiries from the user.

Figure 19:
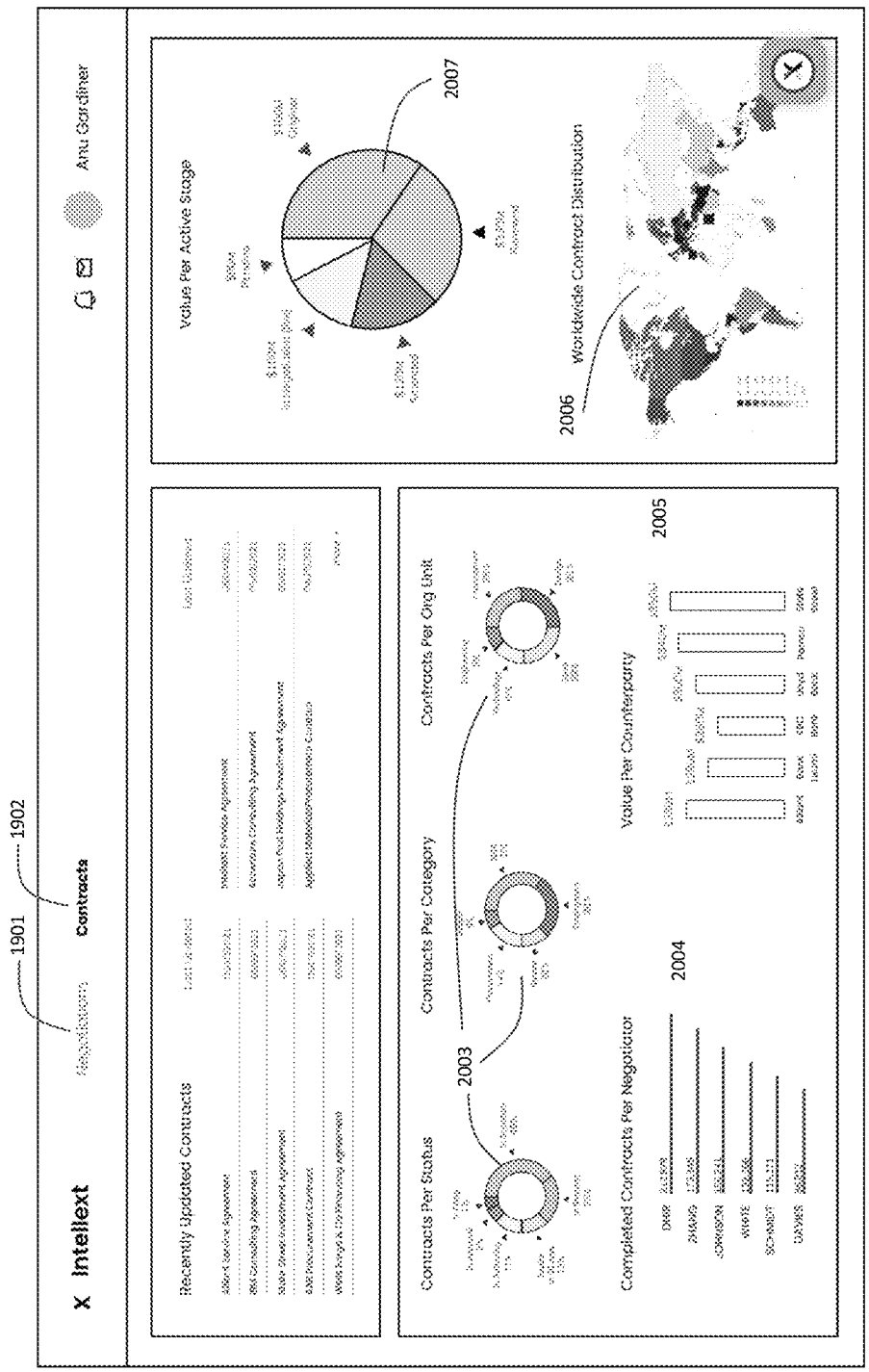
FIG. 19 shows the negotiation platform dashboard.

FIG. 19 shows a dashboard on the system that gives the user access to current negotiations (1901) as well as the contract repository (1902). The dashboard shows a further view of insights available from the intervention generator including descriptive contract statistics with visualization (1903), data about the sales staff (1904), data about counterparties (1905), and longitudinal data about worldwide contracts (1906) and value per active stage of negotiation (1907) for prediction and sale projection purposes.

With the proliferation of virtual reality devices (VR) such as the Oculus series of displays, there are a variety of embodiments where negotiation happens, in part, in a virtual environment. The key differences occur with the omnichannel listener. A negotiator with an HMD that includes a microphone can talk to the counterparty directly. When such devices can capture eye gaze and other inputs from within the display apparatus, all of these are inputs to the omnichannel listener. Furthermore, this embodiment would allow for hybrid negotiations where part of the negotiation happens in VR and other parts happen using conventional communication modes.

Another embodiment of the present invention is as a negotiation training system. Here, the system can include an intelligent counterparty for a negotiator to practice their negotiation skills against. The training system may also include a pedagogical model to guide instructional feedback as an additional module to the intervention generator. As the trainee is negotiating either against a live counterparty or a negotiation bot, the system cues the trainee to best practices, scores their performance, and offers suggestions for improvement.

Two of the issues with the present invention are (1) whether both parties need to negotiate on the same platform or if one can be on and one can be off, and (2) the degree of automaticity possible, thus eliminating or reducing the role of the human negotiator. While there exist methods and products supporting fully-automated (non-human) negotiation, the method presented here is within the constraints of the present invention. The following embodiments address these two issues.

Figure 20:
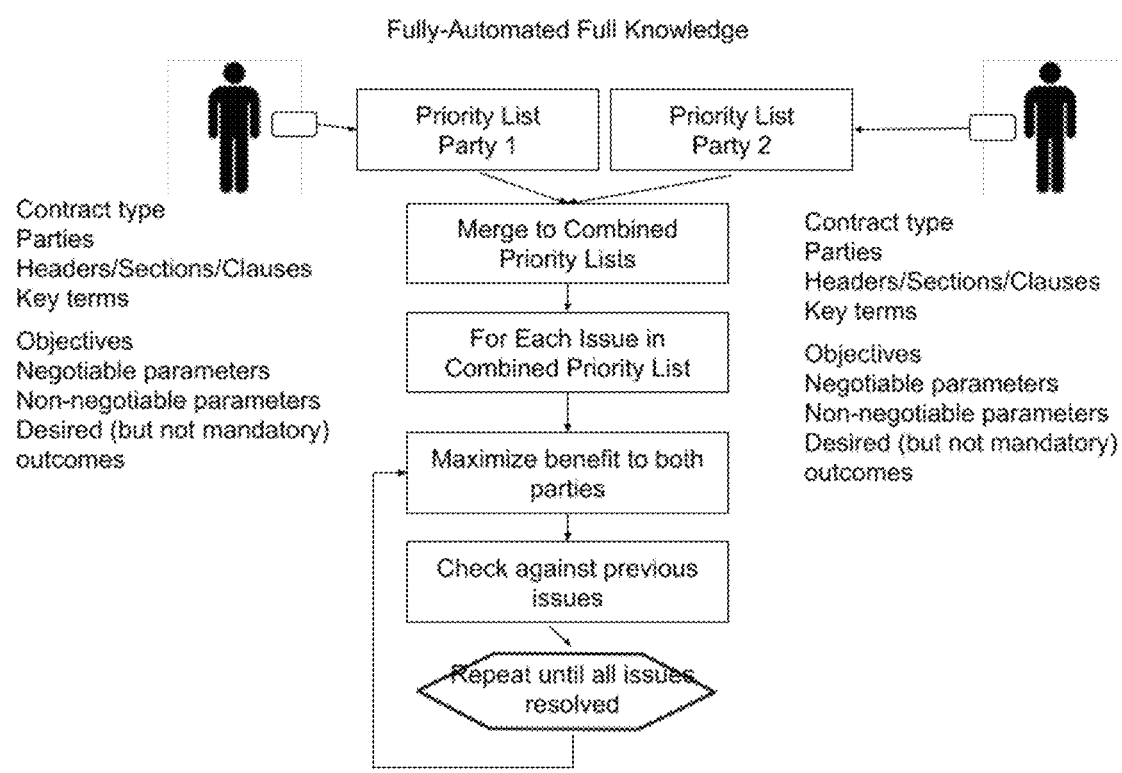
FIG. 20 shows a flow chart of an embodiment where both parties agree to negotiate on the platform (full knowledge of each other's priorities) in full-automation mode.

FIG. 20 shows an embodiment with fully automatic negotiation with full knowledge of both parties. Here, the parties have agreed to share their respective priority lists. This is the output from the term valuator or can be explicitly stated. The priority lists are merged into a combined priority list. Then, for each issue in the combined priority list, the algorithm maximizes the combined value of both parties. The process is repeated until all issues are resolved.

Figure 21:
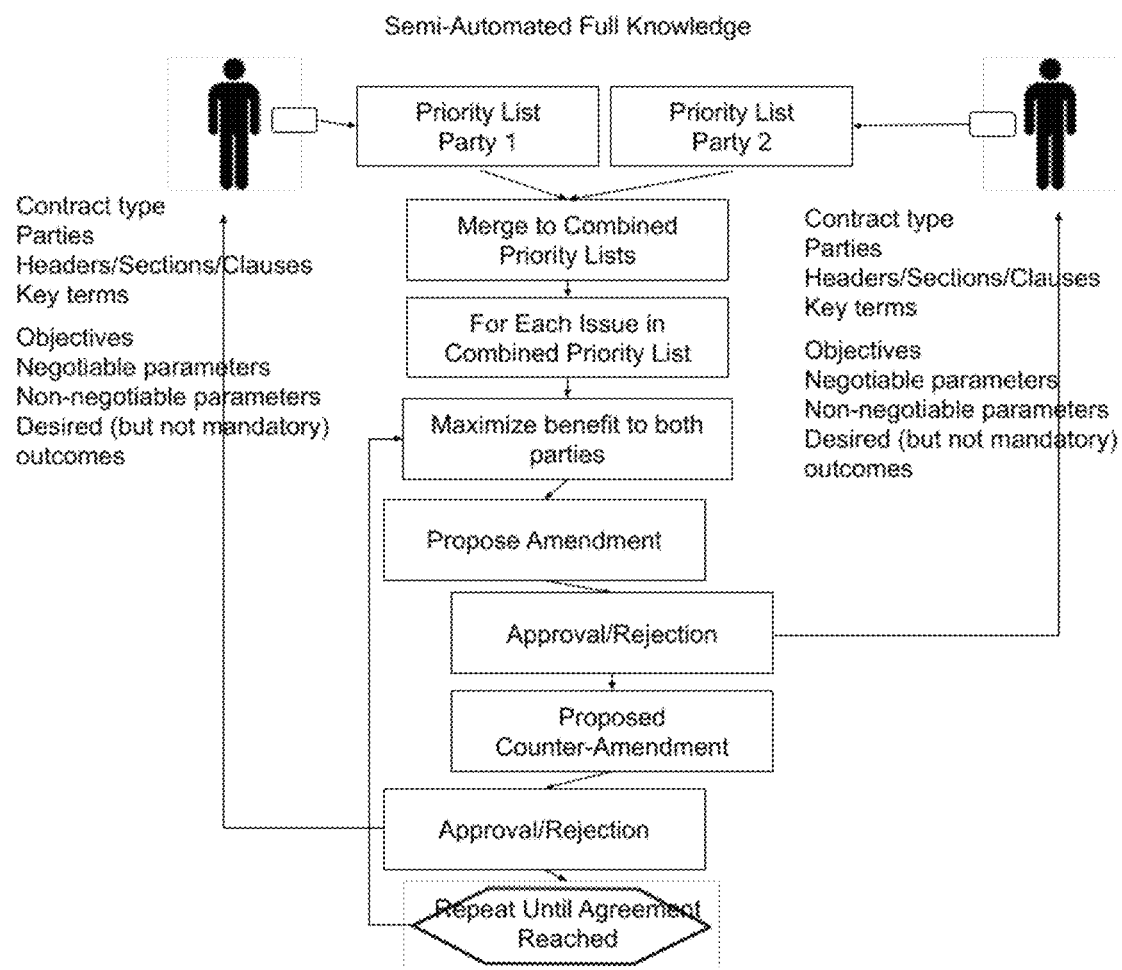
FIG. 21 shows a flow chart of an embodiment where both parties agree to negotiate on the platform (full knowledge of each other's priorities) in semi-automation mode.

An alternative to this embodiment is shown in FIG. 21 which is the same except that the process is semi-automated. Here, the parties again fully disclose their respective priority lists into a combined priority list. The algorithm again attempts to maximize the value to both parties. However, each step through the algorithm includes a feedback loop to the parties where they can approve, reject, or otherwise steer the negotiation via counter proposal or amendment. The process repeats as before until all terms have been agreed to.

Figure 22:
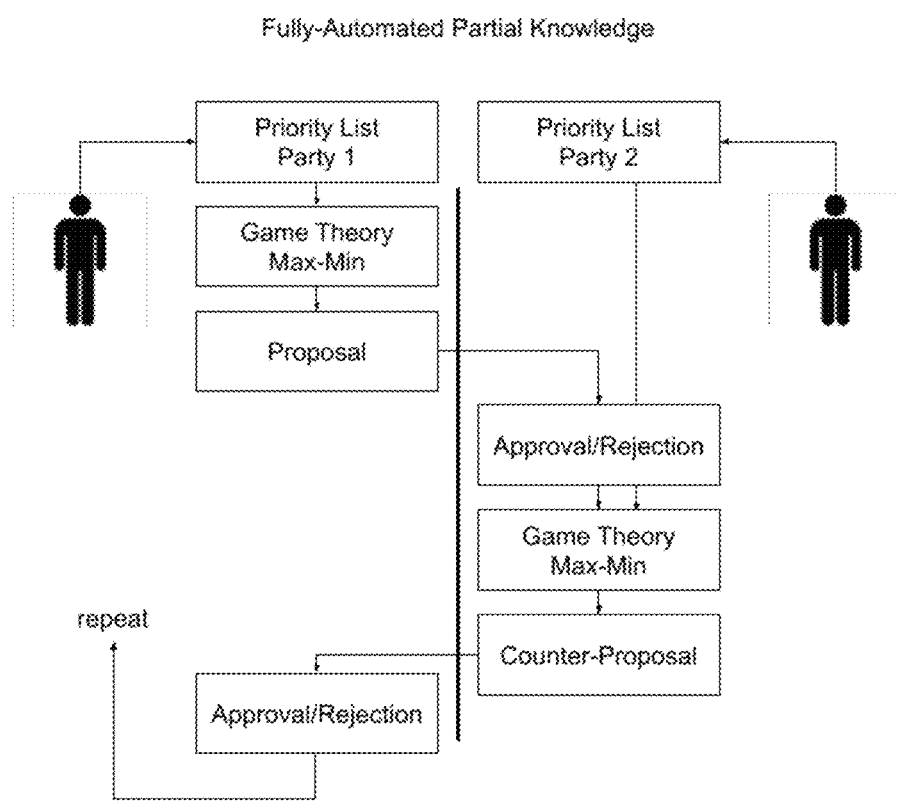
FIG. 22 shows a flow chart of an embodiment where only one party negotiates on the platform (partial knowledge on only party 1) in full-automation mode.

FIG. 22 shows an embodiment where only one party is on the platform. The process is fully automated from the perspective of the negotiator (party 1). Both parties produce a priority list, but in this embodiment, the lists are not disclosed or combined. The system automatically produces a proposal (an offer) that is presented to the counterparty (party 2). The counterparty can accept, reject, or counteroffer. The process repeats until all terms have been agreed to.

Figure 23:
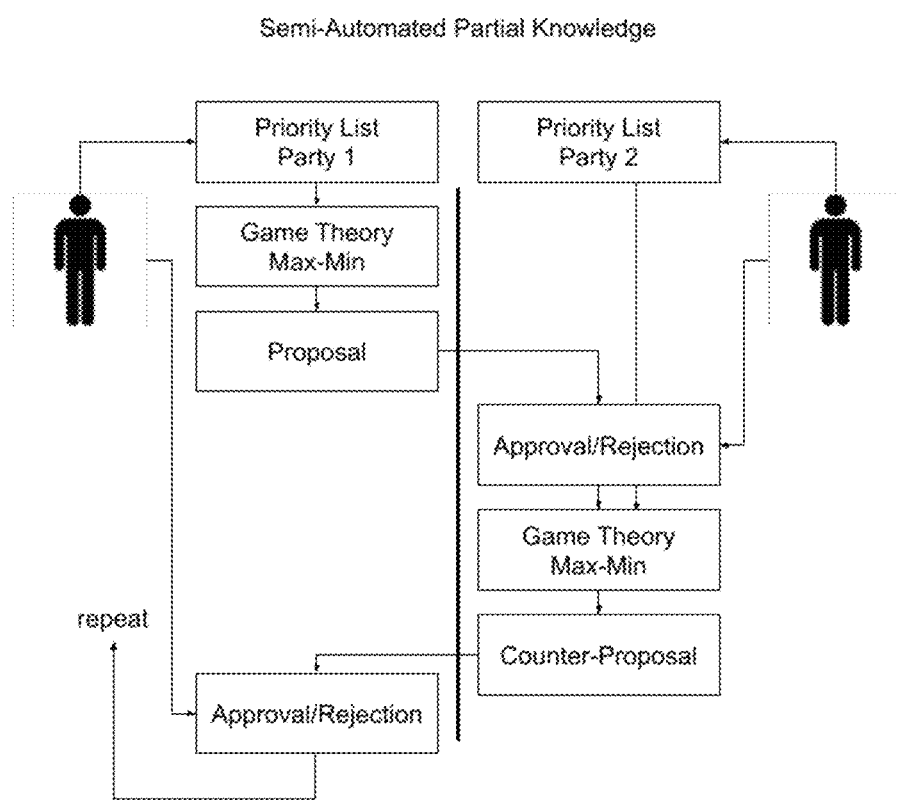
FIG. 23 shows a flow chart of an embodiment where only one party negotiates on the platform (partial knowledge on only party 1) in semi-automation mode.

Lastly, FIG. 23 shows the same configuration but semi-automated with partial knowledge. Here, the same process is followed except that counteroffers from the counterparty (party 2) are presented to the negotiator (party 1) for approval or rejection. When rejected, the system automatically creates a counteroffer that is presented to the counterparty.

INDUSTRIAL APPLICATION

The present invention has practical use in any private transaction, business, or industry, where negotiations take place. It is important to note that the present invention applies to negotiations, not contracts. It is not imperative that the negotiation result in a contract. For example, a private mediation could use the present invention to guide the participants to a positive outcome that resolves their dispute.

What is claimed is:

1. A computer implemented method for assisting a negotiator in a negotiation with a counterparty, comprising:
receiving negotiator input and counterparty input in at least one communication mode including voice, text, and video with voice;
converting; said inputs into a machine readable format;
sequencing each input according to when it was sent including a time stamp and a party, identifier;
when the input is related to at least one term from a term sheet, associating said input with said at least one term;
identifying the sentiment in each input about the associated term and associating the sentiment with said input;
modifying a negotiator model based on the negotiator input and a valuation of the term by the negotiator;
modifying a counterparty model based on the counterparty input and a valuation of the term by the counterparty;
modifying a current negotiation model based on the term sheet, the negotiator model, and the counterparty model;
identifying deviations in the current negotiation model from a referent negotiation model;
creating a set of next actions for the negotiator based on a game theoretic model applied to the current negotiation model and a trade-off matrix, wherein said trade-off matrix is informed by the valuations of the terms by the negotiator and the counterparty;
creating a set of interventions for the negotiator based on the set of next actions, a best practices repository, the negotiator model, the counterparty model, and the current negotiation model; and
presenting the set of interventions to the negotiator in context with the negotiation.

2. The computer implemented method of claim 1 wherein the set of next actions are created based on constraints and guardrails.

3. The computer implemented method of claim 1 wherein the set of next actions and set of interventions are informed by external data services including a negotiation archive of past negotiations, a contract repository, contract metadata from the contract repository, an intranet, the internet, and local enterprise data services.

4. The computer implemented method of claim 1 wherein the negotiator model and the counterparty model are informed by an objective profiler.

5. The computer implemented method of claim 1 wherein the term sheet is produced by a semantic term extractor having a contract ontology.

6. A computer implemented system for assisting a negotiator in a negotiation having a term sheet with a counterparty, the system comprising:
- a computing device with the negotiator, said computing device having a network interface, and at least one input device for text, voice, and video with voice;
- a nonvolatile storage device communicatively coupled to the computing device;
- an omnichannel listener communicatively coupled to the nonvolatile storage device having a computer readable medium containing program instructions by one or more processors of a computer system causing the one or more processors to carry out the steps of:
  - receiving negotiator input and counterparty input via the at least one input device in at least one communication mode including voice, text, and video with voice;
  - converting said inputs into a machine readable format;
  - sequencing each input according to when it was sent including a time stamp and a party identifier;
  - when the input is related to at least one term from a term sheet, associating said input with said at least one term;
  - identifying the sentiment in each input about the associated term and associating the sentiment with said input; and
- an intervention generator communicatively coupled to the omnichannel listener having the computer readable medium containing program instructions by the one or more processors of a computer system causing the one or more processors to carry out the steps of:
  - modifying a negotiator model based on the negotiator input and a valuation of the term by the negotiator;
  - modifying a counterparty model based on the counterparty input and a valuation of the term by the counterparty;
  - modifying a current negotiation model based on the term sheet, the negotiator model, and the counterparty model;
  - identifying deviations in the current negotiation model from a referent negotiation model;
  - creating a set of next actions for the negotiator based on a game theoretic model applied to the current negotiation model and a trade-off matrix, wherein said trade-off matrix is informed by the valuations of the terms by the negotiator and the counterparty;
  - creating a set of interventions for the negotiator based on the set of next actions, a best practices repository, the negotiator model, the counterparty model, and the current negotiation model; and
  - presenting the set of interventions to the negotiator in context with the negotiation.

7. The system of claim 6 further including a semantic term extractor communicatively coupled to the nonvolatile storage device having the computer readable medium containing program instructions by the one or more processors of a computer system causing the one or more processors to carry out the steps of:
- receiving a contract document in a machine readable format;
- receiving a contract ontology having a structured description of contract documents;
- identifying present clauses, optional clauses, and absent clauses, each clause having a clause type and a value;
- extracting said clauses into a term sheet; and
- storing the term sheet to the nonvolatile storage device.

8. The system of claim 7 wherein the omnichannel listener, the intervention generator, and the semantic term extractor reside on the same computing device.

9. The system of claim 7 wherein a third computer readable medium of the semantic term extractor is different from the computer readable medium of the intervention generator and of the second computer readable medium of the omnichannel listener.

10. The system of claim 7 wherein a third one or more processors of the semantic term extractor is different from the one or more processors of the intervention generator and of the second one or more processors of the omnichannel listener.

11. The system of claim 6 wherein the best practices repository resides in a database and includes dynamic rules that indicate the best practices that are then used by the intervention generator to create the set of next actions that coincide with the best practices.

12. The system of claim 6 wherein the intervention generator further includes a network interface to additional data sources including at least one of a negotiation archive of past negotiations, a contract repository, contract metadata from the contract repository, an intranet, the internet, and local enterprise data services.

13. The system of claim 6 further including a personality profiler coupled to the omnichannel listener.

14. The system of claim 6 further including an objective profiler coupled to the intervention generator.

15. The system of claim 6 wherein the intervention generator further includes a behavioral analyzer.

16. The system of claim 6 further including a dynamic constraints and guardrails database bidirectionally coupled to the intervention generator, wherein the intervention generator uses the constraints and guardrails to create the set of next action, and the intervention generator learns new constraints and guardrails from the negotiation and stores said new constraints and guardrails to the dynamic constraints and guardrails database.

17. The system of claim 6 further including a telephonic data interface coupled to the omnichannel listener for processing phone calls as a voice input to the omnichannel listener.

18. The system of claim 6 wherein the computing device further includes a camera that extracts gesture and facial expression from the video input.

19. The system of claim 6 wherein a second computer readable medium of the omnichannel listener is different from the computer readable medium of the intervention generator.

20. The system of claim 6 wherein a second one or more processors of the omnichannel listener is different from the one or more processors of the intervention generator.

* * * * *